US010733565B1

(12) United States Patent
Stephens et al.

(10) Patent No.: US 10,733,565 B1
(45) Date of Patent: Aug. 4, 2020

(54) INTERACTIVE DATA PROCESSING SYSTEM

(71) Applicant: AMAZON TECHNOLOGIES, INC., Seattle, WA (US)

(72) Inventors: Christopher Andrew Stephens, Issaquah, WA (US); Alexander Clark Prater, Seattle, WA (US); Alexander Michael McNamara, Seattle, WA (US); Sridhar Boyapati, Sammamish, WA (US); David Echevarria Ignacio, Seattle, WA (US); David William Bettis, Seattle, WA (US); Korwin Jon Smith, Seattle, WA (US); Kevin Alexander Lee, Seattle, WA (US); Aaron Craig Thompson, Seattle, WA (US); Gary Paolo Raden, Seattle, WA (US); Sudarshan Narasimha Raghavan, Snoqualmie, WA (US); Dilip Kumar, Seattle, WA (US); Félix Joseph Étienne Pageau, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 813 days.

(21) Appl. No.: 14/502,280

(22) Filed: Sep. 30, 2014

(51) Int. Cl.
*G06Q 10/08* (2012.01)
*H04N 7/18* (2006.01)
(Continued)

(52) U.S. Cl.
CPC ....... *G06Q 10/087* (2013.01); *G06K 9/00362* (2013.01); *G06Q 10/08* (2013.01);
(Continued)

(58) Field of Classification Search
CPC ...... G06Q 10/087; G06Q 10/08; H04N 7/181; G06K 9/00362; G06T 7/0004; G06T 2207/30108; G06T 2207/30196
See application file for complete search history.

(56) References Cited

U.S. PATENT DOCUMENTS 7,225,980 B2 6/2007 Ku et al.
7,290,707 B2 * 11/2007 Sawasaki ........... G06Q 10/0875
235/385

(Continued)

OTHER PUBLICATIONS

Verma, Nishchal K., et al. "Template matching for inventory management using fuzzy color histogram and spatial filters." 2015 IEEE 10th Conference on Industrial Electronics and Applications (ICIEA). IEEE, 2015.*

(Continued)

Primary Examiner — Asfand M Sheikh
(74) Attorney, Agent, or Firm — Lindauer Law, PLLC

(57) ABSTRACT

Described is an interactive data processing system configured to facilitate selection by a human associate of tentative values generated by an automated system from sensor data. In one implementation, an event may take place in a materials handling facility. The event may comprise a pick or place of an item from an inventory location, movement of a user, and so forth. The sensor data associated with the event is processed by an automated system to determine tentative values associated with the event. In some situations, an uncertainty may exist as to which of the tentative values accurately reflects the actual event. The sensor data and tentative values may be provided to a human associate. The associate may select one of the tentative values. The selected tentative value and the sensor data may be used to train the automated system.

20 Claims, 13 Drawing Sheets

(51) Int. Cl.
  *G06K 9/00* (2006.01)
  *G06T 7/00* (2017.01)
(52) U.S. Cl.
  CPC ........... *G06T 7/0004* (2013.01); *H04N 7/181* (2013.01); *G06T 2207/30108* (2013.01); *G06T 2207/30196* (2013.01)

(56) References Cited

U.S. PATENT DOCUMENTS

| | | | | |
|---|---|---|---|---|
| 7,769,221 | B1* | 8/2010 | Shakes | B07C 3/14 |
| | | | | 382/141 |
| 7,949,568 | B2 | 5/2011 | Fano et al. | |
| 8,009,864 | B2* | 8/2011 | Linaker | G06K 9/00664 |
| | | | | 235/385 |
| 8,189,855 | B2 | 5/2012 | Opalach et al. | |
| 8,321,302 | B2* | 11/2012 | Bauer | G06K 7/0008 |
| | | | | 705/28 |
| 8,630,924 | B2 | 1/2014 | Groenevelt et al. | |
| 8,688,598 | B1* | 4/2014 | Shakes | G06Q 10/08 |
| | | | | 705/332 |
| 9,041,508 | B2* | 5/2015 | Glickman | G06Q 10/087 |
| | | | | 200/61.61 |
| 9,092,753 | B1* | 7/2015 | Fanelli | G06Q 10/087 |
| 9,142,035 | B1* | 9/2015 | Rotman | G06T 7/60 |
| 9,235,928 | B2 | 1/2016 | Medioni et al. | |
| 9,652,737 | B1* | 5/2017 | Wasilewsky | G06Q 10/087 |
| 9,990,603 | B2* | 6/2018 | Kerrick | G06Q 10/087 |
| 2005/0169367 | A1* | 8/2005 | Venetianer | G06K 9/00369 |
| | | | | 375/240.01 |
| 2006/0173756 | A1* | 8/2006 | Benight | G06Q 10/087 |
| | | | | 705/28 |
| 2007/0100713 | A1* | 5/2007 | Del Favero | G06Q 10/087 |
| | | | | 705/29 |
| 2009/0037244 | A1* | 2/2009 | Pemberton | G06Q 10/087 |
| | | | | 705/28 |
| 2010/0153831 | A1* | 6/2010 | Beaton | G06Q 30/02 |
| | | | | 715/201 |
| 2010/0235406 | A1* | 9/2010 | Williams | G06F 17/30011 |
| | | | | 707/803 |
| 2011/0011936 | A1 | 1/2011 | Morandi et al. | |
| 2012/0284132 | A1 | 11/2012 | Kim et al. | |
| 2013/0084001 | A1* | 4/2013 | Bhardwaj | G06Q 30/0643 |
| | | | | 382/165 |
| 2013/0284806 | A1 | 10/2013 | Margalit | |
| 2014/0003727 | A1* | 1/2014 | Lortz | G06Q 10/087 |
| | | | | 382/218 |
| 2014/0244748 | A1* | 8/2014 | Lintz | H04L 51/32 |
| | | | | 709/204 |
| 2014/0254865 | A1* | 9/2014 | Soubra | G06K 9/00624 |
| | | | | 382/103 |
| 2015/0046299 | A1* | 2/2015 | Yan | G06Q 10/087 |
| | | | | 705/28 |
| 2015/0086107 | A1 | 3/2015 | Dedeoglu et al. | |
| 2015/0234455 | A1* | 8/2015 | LaValle | G06F 3/012 |
| | | | | 345/8 |
| 2015/0262116 | A1* | 9/2015 | Katircioglu | G06K 9/00771 |
| | | | | 705/28 |

OTHER PUBLICATIONS

Weaver, Kimberly A., et al. "An empirical task analysis of warehouse order picking using head-mounted displays." Proceedings of the SIGCHI Conference on Human Factors in Computing Systems. ACM, 2010.*

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Christian, "Introduction to the BodyCom Technology", AN1391, DS01391A, Microchip Technology, Inc., May 2, 2011.

* cited by examiner

INTERACTIVE DATA PROCESSING SYSTEM

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
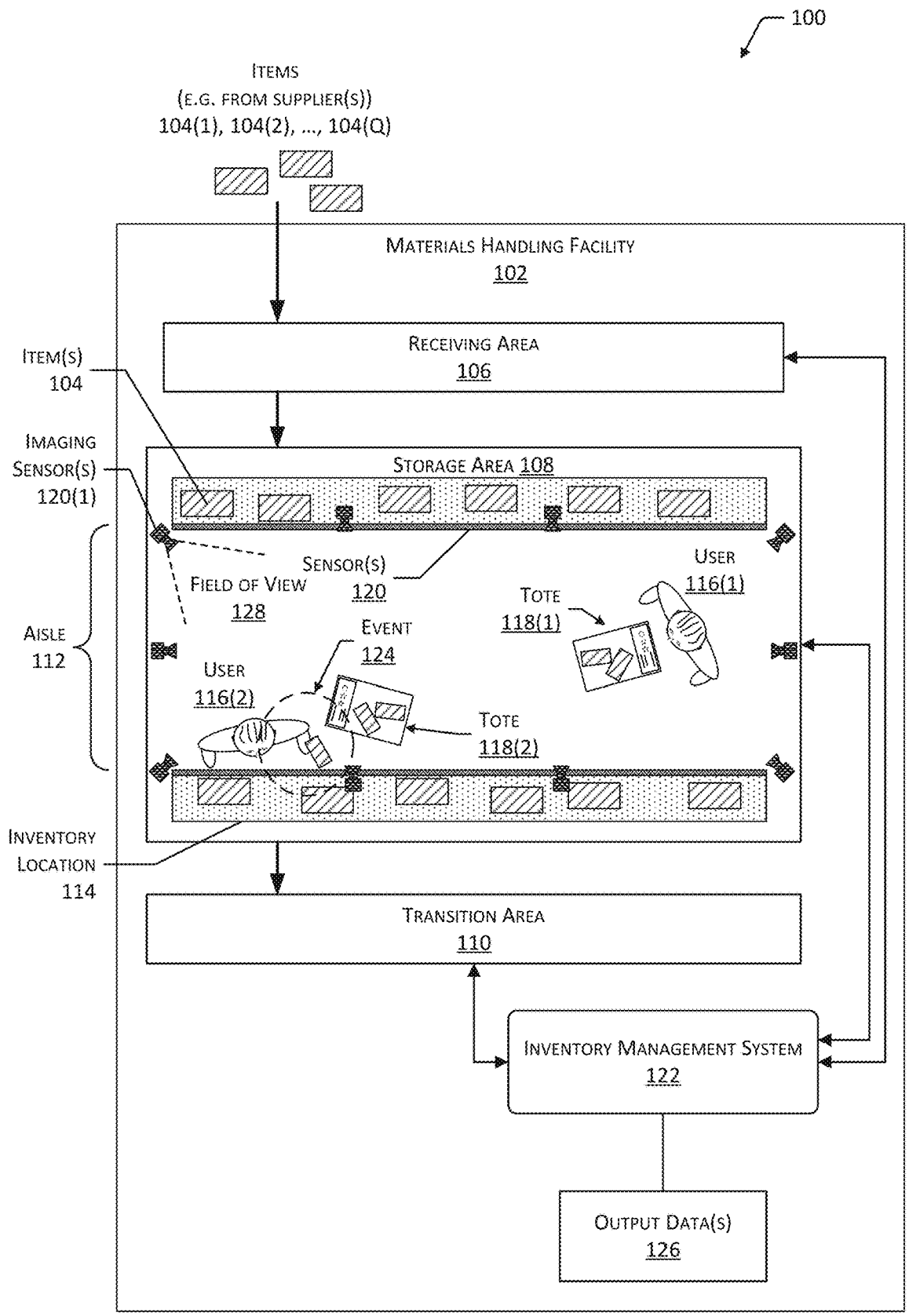
FIG. 1 is a block diagram of a materials handling facility (facility) configured to generate output data about one or more events occurring in the facility, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for generating output data indicative of one or more events occurring within a materials handling facility (facility). The facility may include, or have access to, an inventory management system. The inventory management system may be configured to maintain information about items, users, condition of the facility, and so forth. For example, the inventory management system may maintain data indicative of what items a particular user is ordered to pick, location of the particular user, availability of a user providing support services to others, requests for assistance, environmental status of the facility, and so forth.

Operation of the inventory management system may be supported by sensor data acquired by one or more sensors. The sensor data may include image data acquired by imaging devices such as cameras, information acquired from radio frequency tags, weight sensors, and so forth.

The inventory management system may determine, using the sensor data, occurrence of one or more events within the facility. Events may involve interactions between one or more items, inventory locations, users, totes, robots, changes in sensor operation, movement of objects, and so forth. For example, a user may remove an item from an inventory location. In another example, two or more users may move past one another or attempt to access the same inventory location contemporaneously.

The inventory management system may be configured to generate output data providing information indicative of the event using one or more machine learning or automated systems to process the sensor data. For example, artificial neural networks, classifiers, and so forth, may be used to process the image data of an event and identify the item that was removed from the inventory location, identify the users after they move apart, disambiguate if the user picked or placed an item from an inventory location, and so forth.

The inventory management system may be automated to provide the output data during operation. For example, the inventory management system may automatically identify the item removed from an inventory location. However, in some situations, it may be advantageous to use human input to generate or confirm the output data. In these situations, inquiry data may be provided to one or more devices associated with one or more associates supporting operation of the facility.

The inquiry data may comprise at least a portion of the sensor data associated with the event. For example, the sensor data may comprise image data such as a video clip or still image showing the user interacting with an item. An associate user interface presents at least a portion of the image data and generates response data indicative of the input from the associates. In some implementations, the inquiry data may also comprise tentative values. For example, the tentative values may comprise the possible values associated with the event as generated by the inventory management system. Continuing the example, tentative values may comprise a list of the possible items the user may be interacting with. The response data may comprise data indicative of a selection by the associate of one or more of the tentative values.

In some implementations, the associate user interface may present supplemental data to the associate. The supplemental data may comprise additional information deemed to be of possible use in generating the response data. The supplemental data may comprise overlays of one or more graphical user interface elements. For example, the supplemental data may comprise bounding boxes that are arranged to designate in the image data a particular region of the image that that may be of interest. For example, where the inquiry data is associated with determining the identity of an item, the supplemental data may comprise a bounding box overlaid upon the image data during presentation in the associate user interface. In other implementations, the supplemental data may comprise other information such as descriptive text, weights, relative velocities, and so forth. For example, the supplemental data may comprise velocity data of objects in the image data, and the supplemental data may be overlaid as a "heat map" such that red indicates motion towards the image sensor and blue indicates motion away.

One or more associates may be selected to process the inquiry data. For example, the inquiry data associated with the same event may be distributed to a plurality of associates for processing. The response data from the individual associates may be processed to determine a consensus value. For example, the consensus value may comprise a particular value of response data that was selected by a majority of the associates.

Selection of the associates may be based on type of inquiry, skill of the individual associates, accessibility of the sensor data to the associate, and so forth. For example, the inventory management system may be configured to resolve inquiries about events occurring within the facility within a relatively short threshold of time, such as twenty seconds. Associates located at the facility and having access via a high-speed local area network to the sensor data as stored locally may be selected for processing these inquiries. In comparison, events that are not as time sensitive may be distributed to associates outside of the facility with slower access to the sensor data. In another example, external associates may be used to provide additional verification as to the veracity of the response data generated by the associates within the facility.

The associates may be used to generate response data in a variety of situations. Some events may be deemed to be of high enough priority to warrant human input to generate or confirm the output data. For example, user handling of age restricted or hazardous items may be designated as requiring human assurance as to the output data. For some events, the inventory management system may be unable to generate output data with a confidence level that meets a minimum threshold. For example, the image data may depict a scene that the inventory management system has not been previously configured to process. In another example, the image data may be of decreased quality or contain images that are at least partly obscured, such that the inventory management system is unable to automatically differentiate between two users.

As used herein, the facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

The systems and techniques described herein allow the inventory management system to generate output data that may be used to operate the facility. By distributing inquiry data about events to associates for processing, high accuracy output data may be generated and used to operate the facility without burdening the users of the facility. Furthermore, the output data may be used to train the inventory management system. For example, the sensor data and corresponding output data may be used to train the machine learning portions of the inventory management system, further improving future processing of the sensor data. By using the techniques described herein, the user experience of the users in the facility and overall operation of the inventory management system may be improved.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), ..., 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding or storing the items 104. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), . . . , 116(U), totes 118(1), 118(2), . . . , 118(T) or other material handling apparatus may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the tote 118 may include a basket, a cart, a bag, and so forth. The tote 118 is discussed in more detail below with regard to FIG. 4. In other implementations, other agencies such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, imaging sensors 120(1), weight sensors, radio frequency (RF) receivers, temperature sensors, humidity sensors, vibration sensors, and so forth. The sensors 120 may be stationary or mobile, relative to the facility 102. For example, the inventory locations 114 may contain imaging sensors 120(1) configured to acquire images of pick or placement of items 104 on shelves, of the users 116 in the facility 102, and so forth. In another example, the floor of the facility 102 may include weight sensors configured to determine a weight of the user 116 or other object thereupon. The sensors 120 are discussed in more detail below with regard to FIG. 2.

During operation of the facility 102, the sensors 120 may be configured to provide information suitable for tracking how objects move or other occurrences within the facility 102. For example, a series of images acquired by an imaging sensor 120(1) may indicate removal of an item 104 from a particular inventory location 114 by the user 116 and placement of the item 104 on or at least partially within the tote 118. The tote 118 is discussed in more detail below with regard to FIG. 4.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, multiple different receiving areas 106, storage areas 108, and transition areas 110 may be interspersed rather than segregated in the facility 102.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110. These interactions may include one or more events 124. For example, events 124 may include the entry of the user 116 to the facility 102, stocking of items 104 at an inventory location 114, picking of an item 104 from an inventory location 114, placement of an item 104 within a tote 118, movement of users 116 relative to one another, gestures by the users 116, and so forth. Other events 124 involving users 116 may include the user 116 providing authentication information in the facility 102, using a computing device at the facility 102 to authenticate identity to the inventory management system 122, and so forth. Some events 124 may involve one or more other objects within the facility 102. For example, the event 124 may comprise movement within the facility 102 of an inventory location 114, such as a counter mounted on wheels. Events 124 may involve one or more of the sensors 120. For example, a change in operation of a sensor 120, such as a sensor failure, change in alignment, and so forth, may be designated as an event 124. Continuing the example, movement of an imaging sensor 120(1) resulting in a change in the orientation of the field of view 128 (such as resulting from someone or something bumping the imaging sensor 120(1)) may be designated as an event 124.

By determining the occurrence of one or more of the events 124, the inventory management system 122 may generate output data 126. The output data 126 comprises information about the event 124. For example, where the event 124 comprises an item 104 being removed from an inventory location 114, the output data 126 may comprise an item identifier indicative of the particular item 104 that was removed from the inventory location 114.

The inventory management system 122 may use one or more automated systems to generate the output data 126. For example, an artificial neural network, one or more classifiers, or other automated machine learning techniques may be used to process the sensor data from the one or more sensors 120 to generate output data 126. The automated systems may operate using probabilistic or non-probabilistic techniques. For example, the automated systems may use a Bayesian network. In another example, the automated systems may use support vector machines to generate the output data 126 or the tentative values. The automated systems may generate confidence level data that provides information indicative of the accuracy or confidence that the output data 126 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 104, user 116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 116 may pick an item 104(1) such as a perfume bottle that is generally cubical in shape from the inventory location 114. Other items 104 at nearby inventory locations 114 may be predominately spherical. Based on the difference in shape (cube vs. sphere) from the adjacent items, and the correspondence in shape with the previously stored image of the perfume bottle item 104(1) (cubical and cubical), the confidence level that the user 114 has picked up the perfume bottle item 104(1) is high.

In some situations, the automated techniques may be unable to generate output data 126 with a confidence level above a threshold value. For example, the automated techniques may be unable to distinguish which user 116 in a crowd of users 116 has picked up the item 104 from the inventory location 114.

The confidence level may indicate the estimated divergence of the information in the sensor data to previously stored data. This divergence may be expressed as a distance in In other situations, it may be desirable to provide human confirmation of the event 124 or of the accuracy of the output data 126. For example, some items 104 may be deemed age restricted such that they are to be handled only by users 116 above a minimum age threshold.

Using the techniques described in this disclosure, sensor data associated with an event 124 may be processed to generate inquiry data. The inquiry data may include a subset of the sensor data associated with the event 124. The inquiry data may also include one or more of one or more tentative values as determined by the automated techniques, or supplemental data. The subset of the sensor data may be determined using information about the one or more sensors 120. For example, camera data such as the location of the imaging sensor 120(1) within the facility 102, the orientation of the imaging sensor 120(1), and a field of view 128 of the imaging sensor 120(1) may be used to determine if a particular location within the facility 102 is within the field of view 128. The subset of the sensor data may include images that may show the inventory location 114 or that the item 104 was stowed. The subset of the sensor data may also omit images from other imaging sensors 120(1) that did not have that inventory location 114 in the field of view 128. The field of view 128 may comprise a portion of the scene in the facility 102 that the sensor 120 is able to generate sensor data about.

Continuing the example, the subset of the sensor data may comprise a video clip acquired by one or more imaging sensors 120(1) having a field of view 128 that includes the item 104. The tentative values may comprise the "best guess" as to which items 104 may have been involved in the event 124. For example, the tentative values may comprise values determined by the automated system that have a confidence level above a minimum threshold.

The supplemental data may comprise other information such as the weight of the item 104, bounding boxes or other visual cues to overlay or that have been inserted into the video clip for presentation, and so forth. The inquiry data is provided to a device associated with an associate. For example, the device may comprise a tablet computer, laptop computer, personal computer, set-top box, and so forth. The device presents an associate user interface based at least in part on the inquiry data. Continuing the example, the associate user interface may present the video clip of the item 104 being removed from the inventory location 114. One or more of the tentative values associated with the identity of the item 104 may also be presented in the associate user interface. The associate may view the video clip and the supplemental data and make a selection from the tentative values to identify the item 104 was removed from the inventory location 114. The selection or other information generated by the associate comprises response data. The response data from one or more associates may be processed to generate the output data 126. For example, the majority of the associates may identify the item 104 that was picked from the inventory location 114 as "5 oz box powdered toast". Based at least in part on the majority selection, the inventory management system 122 may generate output data 126 indicating that the item 104 picked was "5 oz box powdered toast".

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102. The receiving of the items 104 may comprise one or more events 124 for which the inventory management system 122 may generate output data 126.

Upon being received from a supplier at receiving area 106, the items 104 may be prepared for storage. For example, items 104 may be unpacked or otherwise rearranged. The inventory management system 122 may include one or more software applications executing on a computer system to provide inventory management functions based on the events 124 associated with the unpacking or rearrangement. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114. Storage of the items 104 and their respective inventory locations 114 may comprise one or more events 124.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102. Picking may comprise one or more events 124, such as the user 116 in moving to the inventory location 114, retrieval of the item 104 from the inventory location 114, and so forth.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the item 104 may be transitioned from the storage area 108 to the packing station. The transitioning may comprise one or more events 124. Information about the transition may be maintained by the inventory management system 122 using the output data 126 associated with those events 124.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102. The purchase or rental may comprise one or more events 124.

During use of the facility 102, the user 116 may move about the facility 102 to perform various tasks, such as picking or placing the items 104 in the inventory locations 114. Pluralities of users 116 may move past one another, travel in groups, may coalesce into groups, groups may break apart, and so forth. These movements may comprise one or more events 124. For example, an event 124 may comprise a plurality of users 116 moving past one another in the aisle 112.

The inventory management system 122 may access or generate sensor data about the facility 102 and the contents therein including the items 104, the users 116, the totes 118, and so forth. The sensor data may be acquired by one or more of the sensors 120, data provided by other systems, and so forth. For example, the sensors 120 may include imaging sensors 120(1) configured to acquire image data of scenes in the facility 102. The image data may comprise still images, video, or a combination thereof. The image data may be processed by the inventory management system 122 to determine a location of the user 116, the tote 118, the identity of the user 116, and so forth. The sensors 120 are discussed in more detail below with regard to FIG. 2.

The inventory management system 122, or systems coupled thereto, may be configured to identify the user 116. In one implementation, this determination may comprise comparing sensor data with previously stored identity data. For example, the user 116 may be identified by showing their face to a facial recognition system, by presenting a token carrying authentication credentials, providing a fingerprint, and so forth. Identification of the user 116 may comprise an event 124 with the output data 126 comprising information indicative of the identity. Identity of the user 116 may be determined before, during, or after entry to the facility 102. Determination of the user's 116 identity may comprise comparing sensor data associated with the user 116 in the facility 102 to previously stored user data.

By determining the occurrence of one or more events 124 and the output data 126 associated therewith, the inventory management system 122 is able to provide one or more services to the users 116 of the facility 102. By utilizing one or more human associates to process inquiry data and generate response data that may then be used to produce output data 126, overall accuracy of the system may be enhanced. The enhanced accuracy may improve the user experience of the one or more users 116 of the facility 102.

Figure 2:
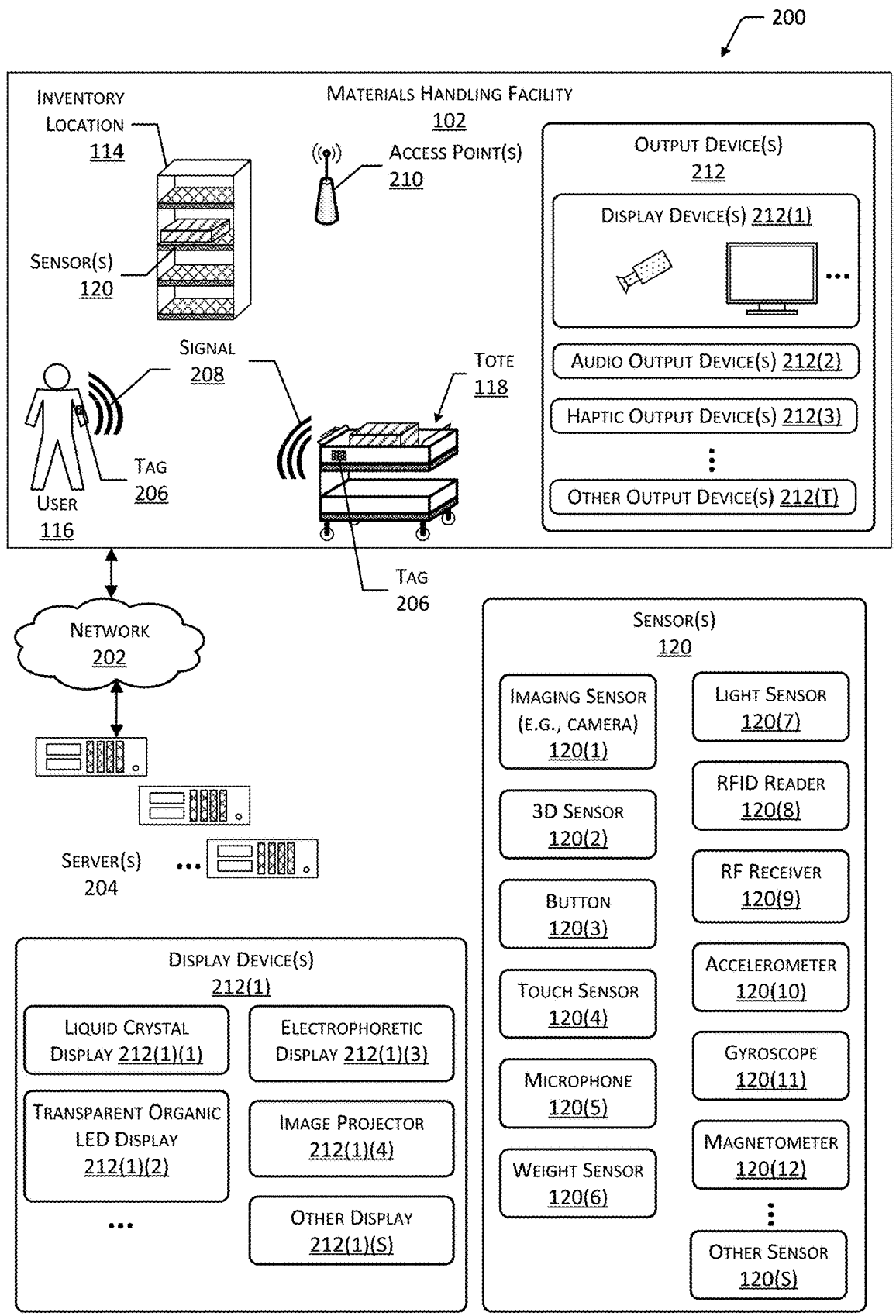
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks such as an institutional or personal intranet, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206, such as radio frequency (RF) tags. The tags 206 may be configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence. For example, an acoustic tag 206 may be configured to generate an ultrasonic signal which is detected by corresponding acoustic receivers. In yet another implementation, the tag 206 may be configured to emit an optical signal.

The inventory management system 122 may be configured to use the tags 206 for one or more of identification of the object, determining a location of the object, and so forth. For example, the users 116 may wear tags 206, the totes 118 may have tags 206 affixed, and so forth, which may be read and, based at least in part on signal strength, used to determine identity and location. Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on the tote 118, may be carried or worn by the user 116, and so forth. The sensors 120 produce respective sensor data.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, determine a location, and so forth, based at least in part on their appearance within the image data.

One or more three-dimensional (3D) sensors 120(2) may also be included in the sensors 120. The 3D sensors 120(2) are configured to acquire spatial or 3D data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the 3D data acquired to identify objects, determine a location of an object, and so forth. For example, the inventory management system 122 may determine operational data such as location in the facility 102 of the user 116 based at least in part on the location in 3D space of the user 116.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116 and produce button data.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch and generate touch sensor data. For example, the IFSR may comprise a material configured to change electrical resistance responsive to an applied force. The position within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire information indicative of sound present In the environment and generate audio data. In some implementations, arrays of microphones 120(5) may be used. These arrays may implement beamforming techniques to provide for directionality of gain. The inventory management system 122 may use the one or more microphones 120(5) to acquire information from acoustic tags, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth and generate weight data. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers, which generate one or more signals based on an applied force, such as that of the load due to gravity. The inventory management system 122 may use the data acquired by the weight sensors 120(6) to identify an object, determine a location of an object, maintain shipping records, identify the user 116, and so forth.

The sensors 120 may include one or more light sensors 120(7) configured to generate light sensor data. The light sensors 120(7) may be configured to provide information associated with ambient lighting conditions such as a level of illumination. Information acquired by the light sensors 120(7) may be used by the inventory management system 122 to adjust a level, Intensity, or configuration of the user interface.

One more radio frequency identification (RFID) readers 120(8), near field communication (NFC) systems, and so forth, may also be provided in the sensors 120. For example, the RFID readers 120(8) may be configured to read the tags 206 and generate RFID tag data. Information acquired by the RFID reader 120(8) may be used by the inventory management system 122 to identify an object associated with the tag 206 such as the item 104, the user 116, the tote 118, and so forth. For example, based on information from the RFID readers 120(8), a velocity of the tag 206 may be determined.

One or more RF receivers 120(9) may also be provided in the sensors 120 to generate radio-frequency data. In some implementations, the RF receivers 120(9) may be part of transceiver assemblies. The RF receivers 120(9) may be configured to acquire RF signals 208 associated with Wi-Fi, Bluetooth, ZigBee, Z-Wave, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10) that may be worn or carried by the user 116, mounted to the tote 118, and so forth. The accelerometers 120(10) may provide accelerometer data such as the direction and magnitude of an imposed acceleration. Data such as rate of acceleration, determination of changes in direction, speed, and so forth, may be determined using the accelerometers 120(10).

A gyroscope 120(11) provides gyroscope data indicative of rotation of an object affixed thereto. For example, the tote 118, the user 116, or other objects may be equipped with a gyroscope 120(11) to provide data indicative of a change in orientation.

A magnetometer 120(12) may be used to determine an orientation by measuring ambient magnetic fields, such as the terrestrial magnetic field. The magnetometer 120(12) may generate magnetometer data indicative of the direction, strength, and so forth of a magnetic field. The magnetometer 120(12) may be worn or carried by the user 116, mounted to the tote 118, and so forth. For example, the magnetometer 120(12) mounted to the tote 118 may act as a compass and provide information indicative of which way the tote 118 is oriented.

The sensors 120 may include other sensors 120(5) as well. For example, the other sensors 120(5) may include proximity sensors, ultrasonic rangefinders, thermometers, barometric sensors, hygrometers, biometric input devices including, but not limited to, fingerprint readers or palm scanners, and so forth. For example, the inventory management system 122 may use information acquired from thermometers and hygrometers in the facility 102 to direct the user 116 to check on delicate items 104 stored in a particular inventory location 114.

The facility 102 may include one or more access points 210 configured to establish one or more wireless networks and the network 202. The access points 210 may use Wi-Fi, NFC, Bluetooth, or other technologies to establish wireless communications between a device and the network 202. The wireless networks allow the devices to communicate with one or more of the inventory management system 122, the sensors 120, the tag 206, a communication device of the tote 118, or other devices.

Output devices 212 may also be provided in the facility 102. The output devices 212 are configured to generate signals which may be perceived by the user 116. The output devices 212 may include display devices 212(1), audio output devices 212(2), haptic output devices 212(3), or other output devices 212(T).

The display devices 212(1) may be configured to provide output which may be seen by the user 116 or detected by a light-sensitive detector such as an imaging sensor 120(1) or light sensor 120(7). The output may be monochrome or color. The display devices 212(1) may be emissive, reflective, or both. An emissive display device 212(1) is configured to emit light during operation. For example, a light emitting diode (LED) is an emissive visual display device 212(1). In comparison, a reflective display device 212(1) relies on ambient light to present an image. For example, an electrophoretic display 212(1)(3) is a reflective display device 212(1). Backlights or front lights may be used to illuminate the reflective visual display device 212(1) to provide visibility of the information in conditions where the ambient light levels are low.

Mechanisms of the display devices 212(1) may include liquid crystal displays 212(1)(1), transparent organic LED displays 212(1)(2), electrophoretic displays 212(1)(3), image projectors 212(1)(4), or other displays 212(1)(S). The other displays 212(1)(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 212(1) may be configured to present images. For example, the display devices 212(1) may comprise a pixel-addressable display. The image may comprise at least a two-dimensional array of pixels or a vector representation of an at least two-dimensional image.

In some implementations, the display devices 212(1) may be configured to provide non-image data, such as text characters, colors, and so forth. For example, a segmented electrophoretic display 212(1)(3), segmented LED, and so forth, may be used to present information such as a stock keeping unit (SKU) number. The display devices 212(1) may also be configurable to vary the color of the text, such as using multicolor LED segments.

In some implementations, display devices 212(1) may be configurable to provide image or non-image output. For example, an electrophoretic display 212(1)(3) with addressable pixels may be used to present images of text information, or all of the pixels may be set to a solid color to provide a colored panel.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

Haptic output devices 212(3) are configured to provide a signal which results in a tactile sensation to the user 116. The haptic output devices 212(3) may use one or more mechanisms such as electrical stimulation or mechanical displacement to provide the signal. For example, the haptic output devices 212(3) may be configured to generate a modulated electrical signal, which produces an apparent tactile sensation in one or more fingers of the user 116. In another example, the haptic output devices 212(3) may comprise piezoelectric or rotary motor devices configured to provide a vibration, which may be felt by the user 116.

The facility 102 may include an interface device that comprises the sensors 120, the output devices 212, or both. For example, the tote 118 may include an interface device such as a display device 212(1) and a touch sensor 120(4). In some implementations, the interface device may include hardware processors, memory, and other elements configured to present a user interface, process input to the user interface, and so forth. Users 116, associates, or both users 116 and associates may use the interface device.

Other output devices 212(T) may also be present. For example, the other output devices 212(T) may include scent/odor dispensers, document printers, 3D printers or fabrication equipment, and so forth.

The inventory management system 122 may generate user interface data, which is then used by the interface device to present the user interface. The user interface may be configured to stimulate one or more senses of the user 116 or associate. For example, the user interface may comprise visual, audible, and haptic output.

Figure 3:
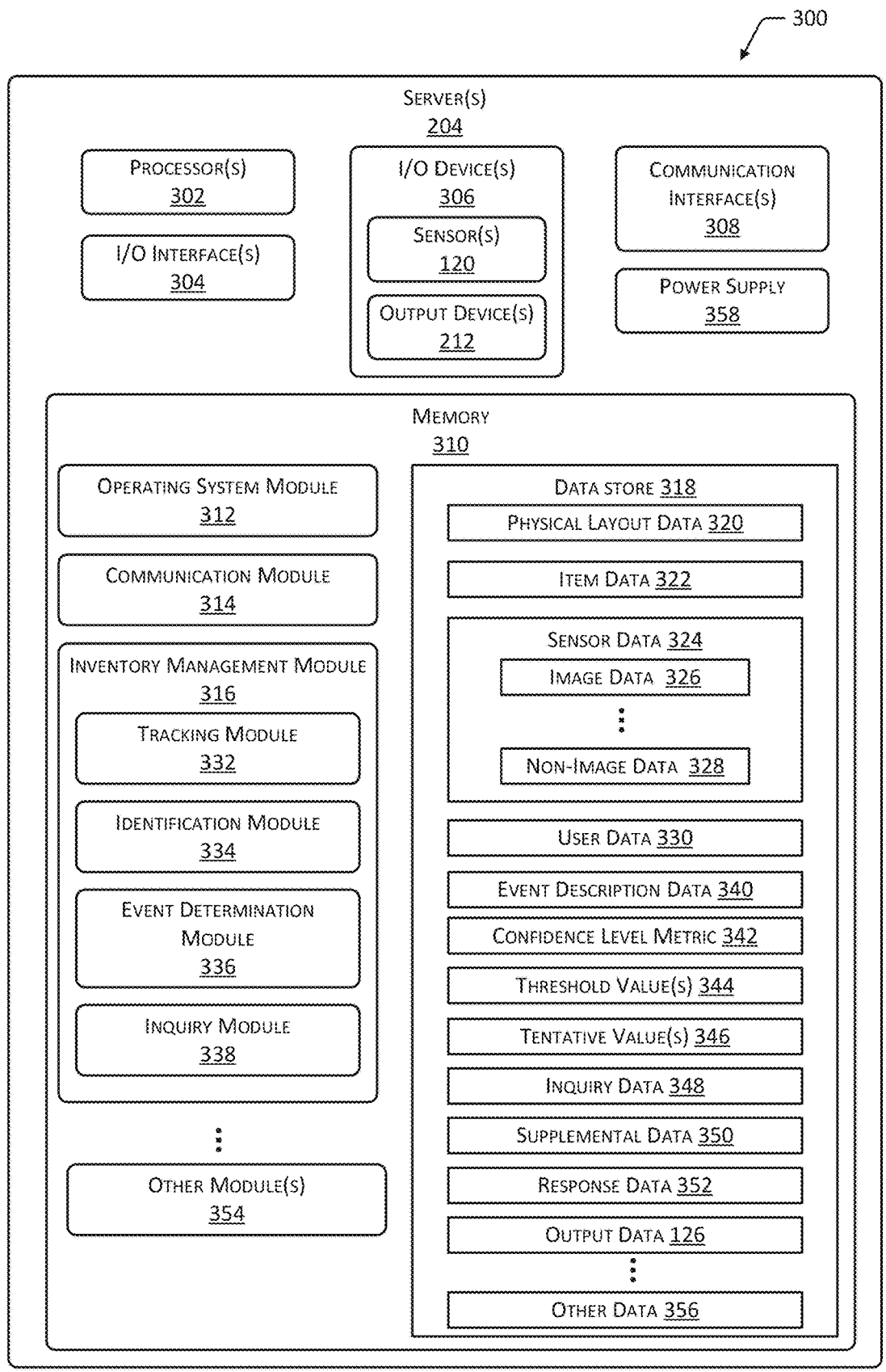
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers," and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as the sensors 120, one or more of a keyboard, mouse, scanner, and so forth. The I/O devices 306 may also include output devices 212 such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, the interface devices, routers, the access points 210, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project; other UNIX or UNIX-like variants; a variation of the Linux operating system as promulgated by Linus Torvalds; the Windows Server operating system from Microsoft Corporation of Redmond, Wash., USA; and so forth.

One or more of the following modules may also be stored in the memory 310. These modules may be executed as foreground applications, background tasks, daemons, and so forth.

A communication module 314 may be configured to establish communications with one or more of the sensors 120, one or more of the devices used by associates, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track movement of items 104 in the facility 102, generate user interface data, and so forth.

The inventory management module 316 may access information stored in a data store 318 in the memory 310. The data store 318 may use a flat file, database, linked list, tree, executable code, script, or other data structure to store the information. In some implementations, the data store 318 or a portion of the data store 318 may be distributed across one or more other devices including other servers 204, network attached storage devices, and so forth.

The data store 318 may include physical layout data 320. The physical layout data 320 provides a mapping of physical locations within the physical layout of devices and objects such as the sensors 120, inventory locations 114, and so forth. The physical layout data 320 may indicate the coordinates within the facility 102 of an inventory location 114, sensors 120 within view of that inventory location 114, and so forth. For example, the physical layout data 320 may include camera data comprising one or more of a location within the facility 102 of an imaging sensor 120(1), orientation of the imaging sensor 120(1), the operational status, and so forth. Continuing the example, the physical layout data 320 may indicate the coordinates of the imaging sensor 120(1), pan and tilt information indicative of a direction that the field of view 128 is oriented along, whether the imaging sensor 120(1) is operating or malfunctioning, and so forth.

In some implementations, the inventory management module 316 may access the physical layout data 320 to determine if a location associated with the event 124 is within the field of view 128 of one or more sensors 120. Continuing the example above, given the location within the facility 102 of the event 124 and the camera data, the inventory management module 316 may determine the imaging sensors 120(1) that may have generated images of the event 124.

The item data 322 comprises information associated with the items 104. The information may include information indicative of one or more inventory locations 114 at which one or more of the items 104 are stored. The item data 322 may also include order data, SKU or other product identifier, price, quantity on hand, weight, expiration date, images of the item 104, detail description information, ratings, ranking, and so forth. The inventory management module 316 may store information associated with inventory management functions in the item data 322.

The data store 318 may also include sensor data 324. The sensor data 324 comprises information acquired from, or based on, the one or more sensors 120. For example, the sensor data 324 may comprise 3D information about an object in the facility 102. As described above, the sensors 120 may include an imaging sensor 120(1), which is configured to acquire one or more images. These images may be stored as the image data 326. The image data 326 may comprise information descriptive of a plurality of picture elements or pixels. Non-image data 328 may comprise information from other sensors 120, such as input from the microphones 120(5), weight sensors 120(6), and so forth.

User data 330 may also be stored In the data store 318. The user data 330 may include identity data, Information Indicative of a profile, purchase history, location data, images of the user 116, demographic data, and so forth. The user data 330 is discussed in more detail below with regard to FIG. 4. Individual users 116 or groups of users 116 may selectively provide user data 330 for use by the inventory management system 122. The individual users 116 or groups of users 116 may also authorize collection of the user data 330 during use of the facility 102 or access to user data 330 obtained from other systems. For example, the user 116 may opt-in to collection of the user data 330 to receive enhanced services while using the facility 102.

In some implementations, the user data 330 may include information designating a user 116 for special handling. For example, the user data 330 may indicate that a particular user 116 has been associated with an increased number of errors with respect to output data 126. The inventory management module 316 may be configured to use this information to apply additional scrutiny to the events 124 associated with this user 116. For example, events 124 that include an item 104 having a cost or value above the threshold amount may be provided to the associates for processing regardless of the determined level of confidence in the output data 126 as generated by the automated system.

The inventory management module 316 may include one or more of a tracking module 332, identification module 334, event determination module 336, or inquiry module 338. The tracking module 332 may be configured to track one or more objects associated with the facility 102. For example, the tracking module 332 may access the sensor data 324 to determine location data.

The location data provides information indicative of a location of an object, such as the item 104, the user 116, the tote 118, and so forth. The location may be absolute with respect to the facility 102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 102, 5.2 m from an inventory location 114 along a heading of 169°, and so forth. For example, the location data may indicate that the user 116(1) is 25.2 m along the aisle 112(1) and standing in front of the inventory location 114(47). In comparison, a relative location may indicate that the user 116(1) is 32 cm from the tote 118 at a heading of 73° with respect to the tote 118. The location data may include orientation information, such as which direction the user 116 is facing. The orientation may be determined by the relative direction the user's 116 body is facing. In some implementations, the orientation may be relative to the interface device. Continuing the example, the location data may indicate that the user 116(1) is oriented with a heading of 0°, or looking north. In another example, the location data may indicate that the user 116 is facing towards the interface device.

The identification module 334 is configured to identify an object. In one implementation, the identification module 334 may be configured to identify an item 104. In another implementation, the identification module 334 may be configured to identify the user 116. For example, the identification module 334 may use facial recognition techniques to process the image data 326 and determine the identity data of the user 116 depicted in the images by comparing the characteristics in the image data 326 with previously stored values. The identification module 334 may also access data from other sensors 120, such as from the RFID reader 120(8), the RF receiver 120(9), fingerprint sensors, and so forth.

Facial recognition may include analyzing facial characteristics which are indicative of one or more facial features in an image, 3D data, or both. For example, the face of the user 116 may be detected within one or more of the images of the image data 326. The facial features include measurements of, or comparisons between, facial fiducials or ordinal points. The facial features may include eyes, mouth, lips, nose, chin, ears, face width, skin texture, 3D shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors, as descriptive of a human face, may be known as "eigenfaces" or "eigenimages".

In one implementation, the facial recognition described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity of the user 116. The eigenvectors or other measurements may be compared with previously stored characteristics to determine the user data 330 of the person in the image or to distinguish one user 116 from another.

The event determination module 336 is configured to process the sensor data 324 and generate output data 126. The event determination module 336 may access information stored in the data store 318 including, but not limited to, event description data 340, confidence level metrics 342, or threshold values 344.

The event description data 340 comprises information indicative of one or more events 124. For example, the event description data 340 may comprise predefined profiles that designate movement of an item 104 from an inventory location 114 with the event 124 of "pick". The event description data 340 may be manually generated or automatically generated. The event description data 340 may include data indicative of triggers associated with events occurring in the facility 102. An event may be determined as occurring upon detection of the trigger. For example, sensor data 324 such as a change in weight from a weight sensor 120(6) at an inventory location 114 may trigger detection of an event of an item 104 being added or removed from the inventory location 114. In another example, the trigger may comprise an image of the user 116 reaching a hand toward the inventory location 114. In yet another example, the trigger may comprise two or more users 116 approaching to within a threshold distance of one another.

The event determination module 336 may process the sensor data 324 using one or more techniques including, but not limited to, artificial neural networks, classifiers, decision trees, support vector machines, Bayesian networks, and so forth. For example, the event determination module 336 may use a decision tree to determine occurrence of the "pick" event 124 based on sensor data 324. The event determination module 336 may further use the sensor data 324 to determine one or more tentative values 346. The one or more tentative values 346 comprise data associated with the event 124. For example, where the event 124 comprises a disambiguation of users 116, the tentative values 346 may comprise a list of possible user 116 identities. In another example, where the event 124 comprises a disambiguation between items 104, the tentative values 346 may comprise a list of possible item identifiers. In some implementations, the tentative value 346 may indicate the possible action. For example, the action may comprise the user 116 picking, placing, moving an item 104, damaging an item 104, providing gestural input, and so forth.

In some implementations, the tentative values 346 may be generated by other modules. For example, the tentative values 346 such as one or more possible identities or locations of the user 116 involved in the event 124 may be generated by the tracking module 332. In another example, the tentative values 346 such as possible items 104 that may have been involved in the event 124 may be generated by the identification module 334.

The event determination module 336 may be configured to provide a confidence level metric 342 associated with the determination of the tentative values 346. The confidence level metric 342 provides indicia as to the expected level of accuracy of the tentative value 346. For example, a low confidence level metric 342 may indicate that the tentative value 346 has a low probability of corresponding to the actual circumstances of the event 124. In comparison, a high confidence level metric 342 may indicate that the tentative value 346 has a high probability of corresponding to the actual circumstances of the event 124.

In some implementations, the tentative values 346 having confidence level metrics 342 that exceed the threshold value 344 may be deemed to be sufficiently accurate and thus may be used as the output data 126. For example, the event determination module 336 may provide tentative values 346 indicative of the three possible items 104(1), 104(2), and 104(3) corresponding to the "pick" event 124. The confidence level metrics 342 associated with the possible items 104(1), 104(2), and 104(3) may be 25%, 70%, 92%, respectively. Continuing the example, the threshold value 344 may be set such that confidence level metrics 342 of 90% are deemed to be sufficiently accurate. As a result, the event determination module 336 may designate the "pick" event 124 as involving item 104(3).

In situations where the event determination module 336 determines that the confidence level metric 342 associated with the tentative value 346 is below a threshold value 344, the inquiry module 338 may be utilized. In other situations, such as where verification by human operator is desired, the inquiry module 338 may also be utilized.

The inquiry module 338 may be configured to use at least a portion of the sensor data 324 associated with the event 124 to generate inquiry data 348. In some implementations, the inquiry data 348 may include one or more of the tentative values 346 or supplemental data 350. The inquiry module 338 may be configured to provide inquiry data 348 to one or more devices associated with one or more human associates.

An associate user interface is presented on the respective devices of associates. The associate may generate response data 352 by selecting a particular tentative value 346, entering new information, indicating that they are unable to answer the inquiry, and so forth. The associate user interface is discussed in more detail below in FIGS. 7-10.

The supplemental data 350 comprises information associated with the event 124 or that may be useful in interpreting the sensor data 324. For example, the supplemental data 350 may comprise previously stored images of the items 104. In another example, the supplemental data 350 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 326 during presentation to an associate.

In one example, the edges of an object associated with the event may be determined in the image. For example, the OpenCV function "Canny" that implements the Canny Edge Detector algorithm may be used to determine the output of an item 104 or user 116 in the image. Once the edges have been determined, data specifying coordinates of a bounding box configured to encompass the edges of the object may be determined. For example, the coordinates for opposite corners of the bounding box may be designated as the pixels on the edge that are closest and farthest from an origin point in the image. The bounding box thus encompasses or surrounds the edges of the object. The supplemental data 350 may include the coordinates. The associate user interface 608 may then use these coordinates to render the bounding box on the device 606. In another implementation, the supplemental data 350 may be used to modify the portion of the image data 326 prior to delivery to the device 606. For example, the bounding box may be rendered and incorporated into the image data 326 prior to delivery to the device 606.

The inquiry module 338 processes the response data 352 provided by the one or more associates. The processing may include calculating one or more statistical values associated with the response data 352. For example, statistical values may include a count of the number of times associates selected a particular tentative value 346, determination of a percentage of the associates that selected a particular tentative value 346, and so forth.

The inquiry module 338 is configured to generate the output data 126 based at least in part on the response data 352. For example, given that a majority of the associates returned response data 352 indicating that the item 104 associated with the "pick" event 124 is item 104(5), the output data 126 may indicate that the item 104(5) was picked.

The inquiry module 338 may be configured to selectively distribute inquiries to particular associates. For example, some associates may be better suited to answering particular types of inquiries. Performance data, such as statistical data about the performance of the associates, may be determined by the inquiry module 338 from the response data 352 provided by the associates 602. For example, information indicative of a percentage of different inquiries in which the particular associate selected response data 352 that disagreed with the majority of associates may be maintained. In some implementations, test or practice inquiry data 348 having a previously known correct answer may be provided to the associate for training or quality assurance purposes. The determination of the set of associates to use may be based at least in part on the performance data.

By using the inquiry module 338, the event determination module 336 may be able to provide high reliability output data 126 that accurately represents the event 124. The output data 126 generated by the inquiry module 338 from the response data 352 may also be used to further train the automated systems used by the inventory management module 316. For example, the sensor data 324 and the output data 126, based on response data 352, may be provided to one or more of the modules of the inventory management system 316 for training in process improvement. Continuing the example, this information may be provided to an artificial neural network, Bayesian network, and so forth, to further train these systems such that the confidence level metric 342 and the tentative values 346 produced in the future for the same or similar input is improved.

Other modules 354 may also be present in the memory 310. For example, an accounting module may be configured to generate information indicative of a cost of goods picked by the user 116. Other data 356 may also be stored in the data store 318. For example, the other data 356 may comprise the cost of goods picked by the user 116, payment information, and so forth.

The server 204 may also include a power supply 358. The power supply 358 is configured to provide electrical power suitable for operating the components in the server 204.

Figure 4:
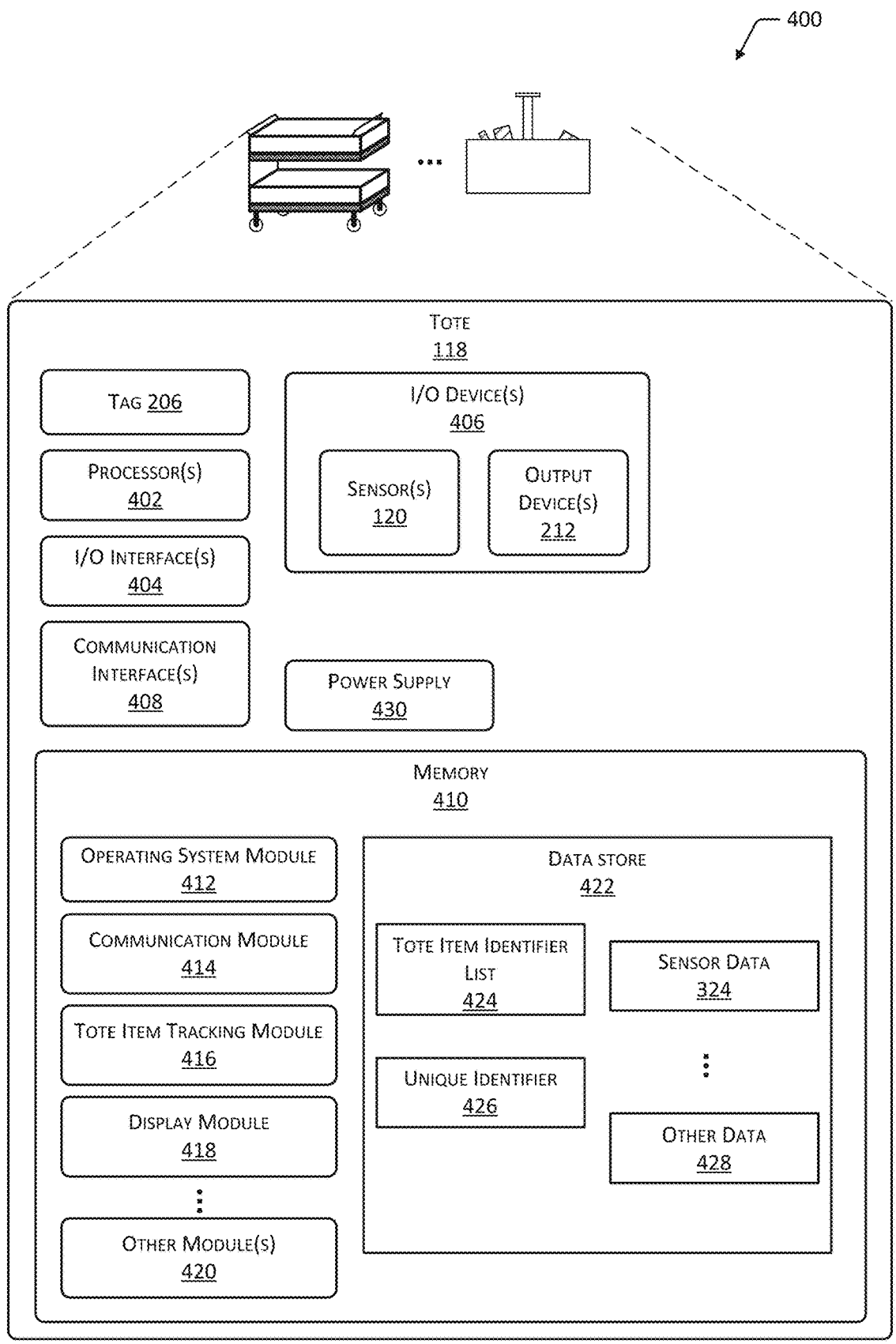
FIG. 4 is a block diagram of a tote, according to some implementations.

FIG. 4 illustrates a block diagram 400 of the tote 118, according to some implementations. The tote 118 may include several form factors such as a wheeled cart, hand-carried cart, bag, and so forth. For example, the tote 118 may include a plurality of wheels enabling the tote 118 to be moved within the facility 102.

The tote 118 may include a tag 206. The tag 206 may be affixed to, integral with, or otherwise associated with the tote 118. In some implementations, the tote 118 may have identifiers, tags 206, or other indicia thereupon. For example, a machine-readable optical code, such as a barcode, may be affixed to a side of the tote 118.

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include imaging sensors 120(1), weight sensors 120(6), RFID readers 120(8), and so forth. The I/O devices 406 may also include output devices 212 such as display devices 212(1), audio output devices 212(2), haptic output devices 212(3), and so forth.

The tote 118 may also include one or more communication interfaces 408. The communication interfaces 408 are configured to provide communications between the tote 118 and other devices, such as other totes 118, interface devices, routers, access points 210, the servers 204, and so forth. The communication interfaces 408 may include devices configured to couple to PANs, LANs, WANs, and so forth. For example, the communication interfaces 408 may include devices compatible with Ethernet, Wi-Fi, Bluetooth, ZigBee, Z-Wave, 3G, 4G, LTE, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above with regard to memory 310 on server 204. The memory 410 provides storage of computer readable instructions, data structures, program modules, and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD operating system as promulgated by the FreeBSD Project; other UNIX or UNIX-like variants; and a variation of the Linux operating system, such as Android as promulgated by Google, Inc. of Mountain View, Calif., USA. Other OS modules 412 may be used, such as the Windows operating system from Microsoft Corporation of Redmond, Wash., USA; the LynxOS from LynuxWorks of San Jose, Calif., USA; and so forth.

One or more of the following modules may also be stored in the memory 410. These modules may be executed as foreground applications, background tasks, daemons, and so forth.

A communication module 414 may be configured to establish communications with one or more of the sensors 120, interface devices, the servers 204, or other devices. The communications may be authenticated, encrypted, and so forth.

The memory 410 may also store a tote item tracking module 416. The tote item tracking module 416 is configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 120(6) and an RFID reader 120(8) or NFC. The tote item tracking module 416 may send the list of items 104 to the inventory management system 122. The tote item tracking module 416 may also be configured to receive information from the inventory management system 122. For example, a list of items 104 to be picked may be presented within a user interface on the display device 212(1) of the tote 118.

The memory 410 may include a display module 418. The display module 418 may be configured to present information, such as received from the one or more servers 204 or generated onboard the tote 118, using one or more of the interface devices. For example, the display module 418 may comprise a rendering engine configured to process the user interface data received from the server 204 to generate the user interface. In some implementations, the display module 418 may also process input made to the user interface by way of the input devices. In another implementation, the display module 418 may provide one or more of the functions described above with regard to the inventory management module 316.

Other modules 420 may also be stored within the memory 410. In one implementation, a data handler module may be configured to generate data indicative of the user 116, the tote 118, or another of one or more objects in range of the sensors 120 of the tote 118. The resulting sensor data 324 may be provided to the inventory management module 316. For example, image data 326 obtained from an imaging sensor 120(1) on the tote 118 may be provided by the inquiry module 338 to one or more associates.

The memory 410 may also include a data store 422 to store information. The data store 422 may use a flat file, database, linked list, tree, executable code, script, or other data structure to store information. In some implementations, the data store 422 or a portion of the data store 422 may be distributed across one or more other devices including the servers 204, other totes 118, network attached storage devices, and so forth.

The data store 422 may store a tote item identifier list 424. The tote item identifier list 424 may comprise data indicating one or more items 104 associated with the tote 118. For example, the tote item identifier list 424 may indicate the items 104 which are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable, non-volatile memory, such as a programmable read-only memory (PROM). In some implementations, the unique identifier 426 may be part of a communication interface 408. For example, the unique identifier 426 may comprise a media access control (MAC) address associated with a Bluetooth interface.

The data store 422 may also store sensor data 324. The sensor data 324 may be acquired from the sensors 120 onboard the tote 118.

Other data 428 may also be stored within the data store 422. For example, tote configuration settings, user interface preferences, and so forth, may be stored in the data store 422.

The tote 118 may also include a power supply 430. The power supply 430 is configured to provide electrical power suitable for operating the components in the tote 118. The power supply 430 may comprise one or more of photovoltaic cells, batteries, wireless power receivers, fuel cells, capacitors, and so forth.

Figure 5:
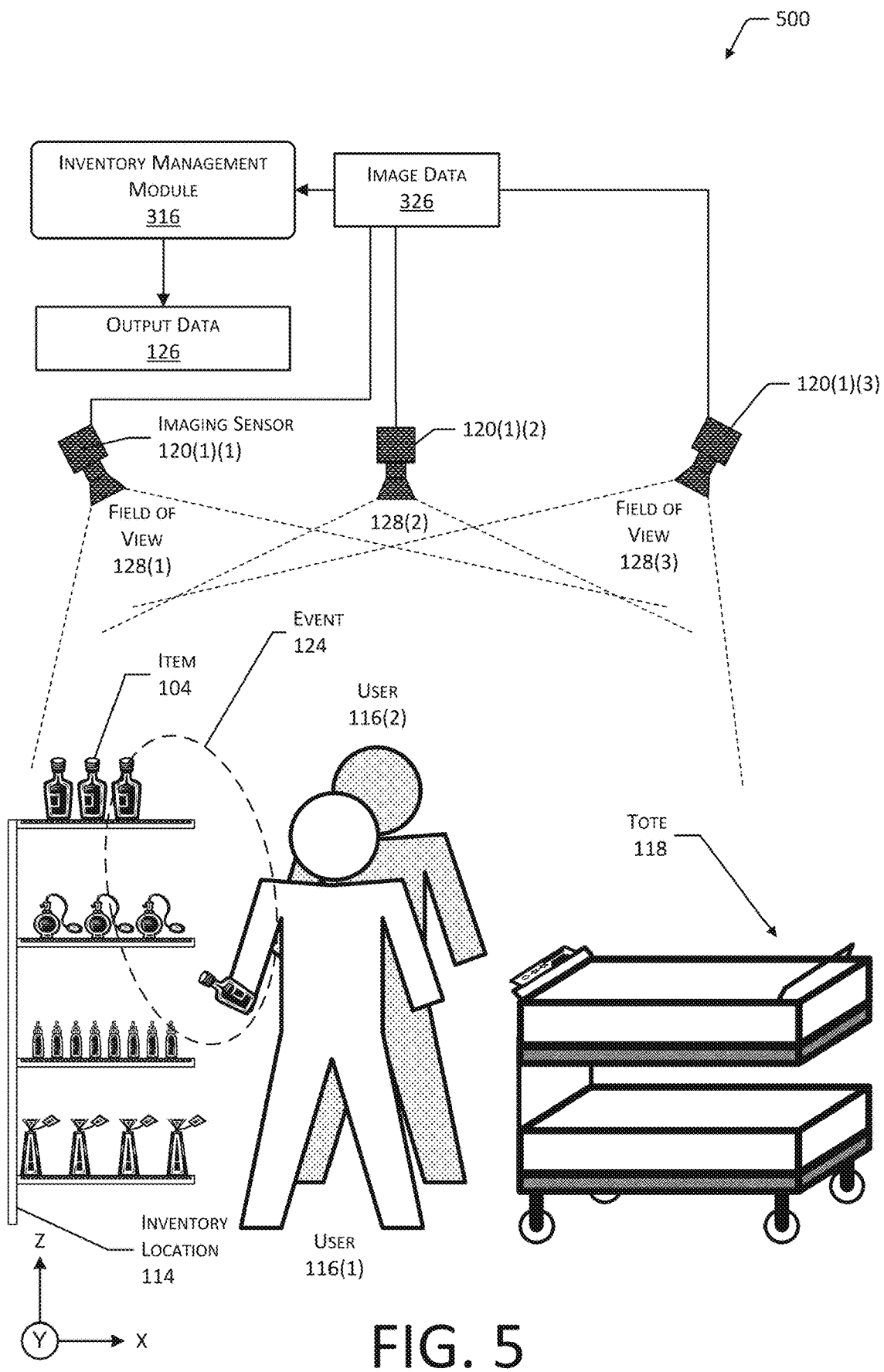
FIG. 5 illustrates imaging sensors configured to acquire sensor data in the facility, according to some implementations.

FIG. 5 illustrates a side view 500 of imaging sensors 120(1) configured to acquire image data 326 in the facility 102, according to some implementations. The image data 326 may include images of items 104, inventory locations 114, users 116, totes 118, and other objects.

In some implementations, such as depicted here, the facility 102 may include one or more sensors 120 that are configured to acquire data from an overhead vantage point. The sensors 120 may include, but are not limited to, one or more of the imaging sensors 120(1), the 3D sensors 120(2), the microphones 120(5), the RFID readers 120(8), the RF receivers 120(9), and so forth. As described above, the imaging sensors 120(1) have a field of view 128.

In this illustration, the imaging sensors 120(1)(1), 120(1)(2), and 120(1)(3) are arranged overhead relative to the user 116 and are configured to generate the image data 326. The respective fields of view 128(1)-(3) depicted here include an inventory location 114, one or more items 104, the users 116(1) and 116(2), and the tote 118. The sensor data 324, including the image data 326, may be provided to the inventory management system 122. For example, non-image sensor data 328 acquired from one or more weight sensors 120(6) of the inventory locations 114 may be provided to the inventory management module 316.

The inventory management module 316 executing on the server 204 may process the sensor data 324 to determine occurrence of an event 124. For example, based on the sensor data 324, the event determination module 336 may determine that the event 124 comprising a "pick" of an item 104 has occurred. However, given the proximity of the user 116(2) to the user 116(1), the event determination module 336 may have a low confidence level metric 342 as to which of the users 116 picked the item 104. Where the low confidence level metric 342 is below the threshold value 344, the event determination module 336 may utilize the inquiry module 338. The inquiry module 338 may generate inquiry data 348 including a least a portion of the sensor data 324 associated with the event 124. The inquiry data 348 may be sent to one or more associates as described below with regard to FIG. 6. The response data 352 may be received from the one or more associates, and based thereon, the output data 126 may indicate that the user 116(1) was responsible for the "pick" of the item 104.

Figure 6:
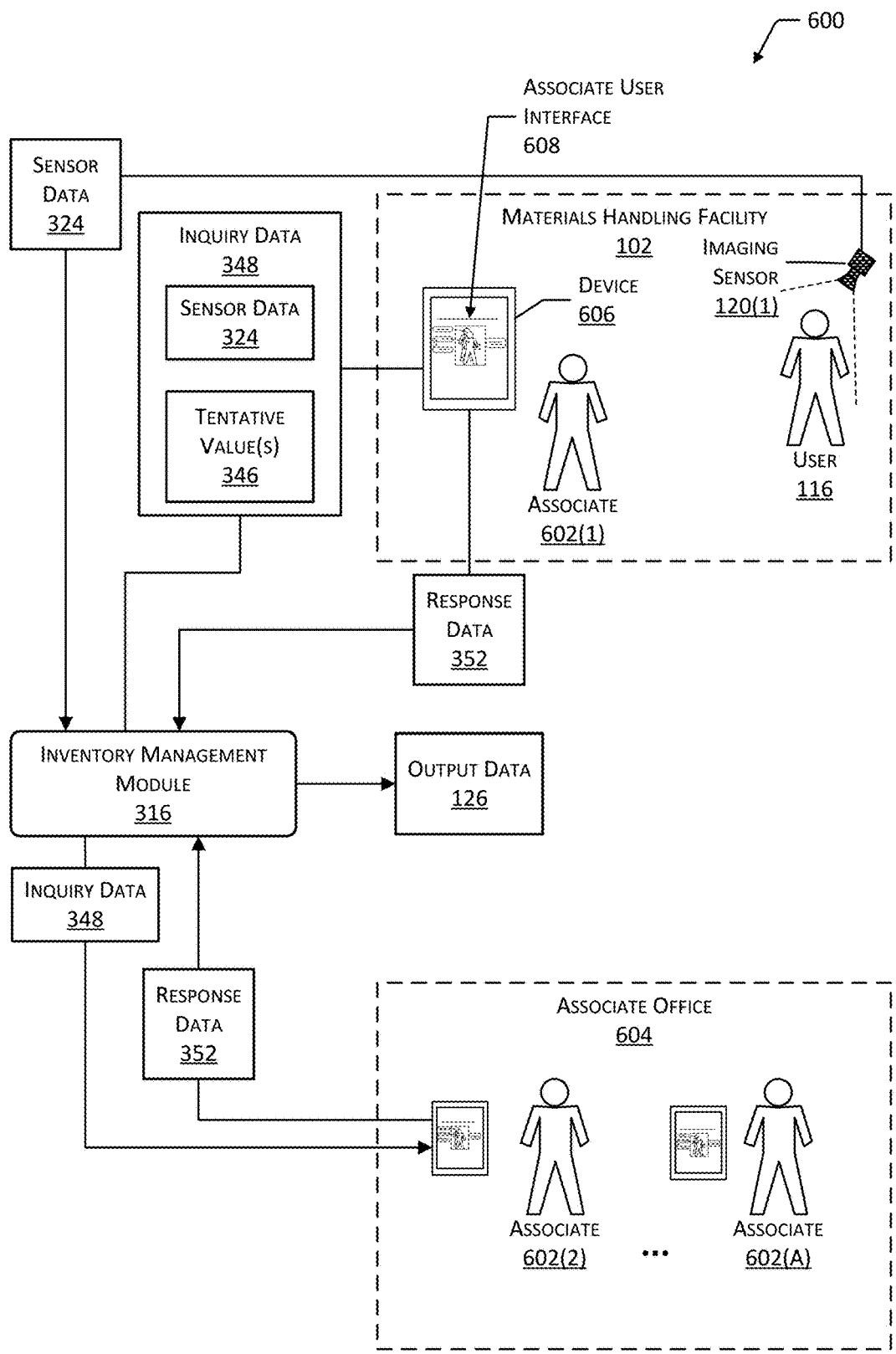
FIG. 6 illustrates a block diagram of distributing inquiry data to associates to generate response data that is used to generate output data, according to some implementations.

FIG. 6 illustrates a block diagram 600 of distributing inquiry data 348 to associates to generate response data 352 that is used to generate output data 126, according to some implementations.

One or more associates 602(1), 602(2), . . . , 602(A) may be present at one or more locations. For example, some associates 602 may be present at the facility 102. As depicted here, associate 602(1) is on-site at the facility 102. Other associates 602 may be elsewhere, such as at an associate office 604.

Each associates 602 may have one or more devices 606 with which they may process inquiry data 348. One or more devices 606 may comprise smartphones, tablet computers, personal computers, laptop computers, set-top boxes, and so forth. The device 606 is able to present an associate user interface 608. The associate user interface 608 is described in more detail below with regard to FIGS. 7-10.

As described above, one or more sensors 120 in the facility 102 provide sensor data 324 to the inventory management module 316. As described above, the inventory management module 316 may process at least a portion of sensor data 324. For example, the event determination module 336 may determine the occurrence of an event 124 and one or more tentative values 346 associated with the event 124. In situations where the tentative values 346 are below a threshold value 344, or special circumstances call for human processing, the inquiry module 338 may generate the inquiry data 348.

As described above, the inquiry data 348 comprises at least a portion of the sensor data 324 and may also include one or more of the tentative values 346. Inquiry data 348 is received by the device 606 and presents the associate user interface 608. The associate 602 provides input using the associate user interface 608 and the device 606 returns response data 352 to the inventory management module 316. As described above, the inventory management module 316 may process the response data 352 obtained from one or more associates 602 to generate the output data 126.

In some implementations, the distribution of inquiry data 348 to particular associates 602 or sets of associates 602 may be based at least in part on service level or service level agreements (SLAs) associated with the facility 102. For example, a SLA may specify a response time such that the output data 126 for pick events 124 is to be determined in less than 20 seconds after the occurrence of an event 124. In another example, the service level may specify a response time to return the response data 352. In such situations, the inquiry data 348 may be directed to the associate 602(1), who is on-site at the facility 102 and thus has high-bandwidth access using the local area network of the facility 102 to access the sensor data 324. In another example, the SLA may specify that the response data 352 or the output data 126 associated with receiving items 104 at the facility 102 is to be determined in less than 15 minutes. In this example, the inquiry data 348 may be sent to the off-site associate 602(2) at the associate office 604, who has relatively smaller bandwidth access to the sensor data 324. A threshold level of time may thus be used to determine whether to use the associates 602 on-site or off-site.

In some implementations, the inquiry data 348 may include at least a portion of the sensor data 324, or the inquiry data 348 may comprise retrieval data associated with the sensor data 324. For example, the retrieval data may comprise a uniform resource identifier that may be used to access image data 326 stored on the server 204.

Figure 7:
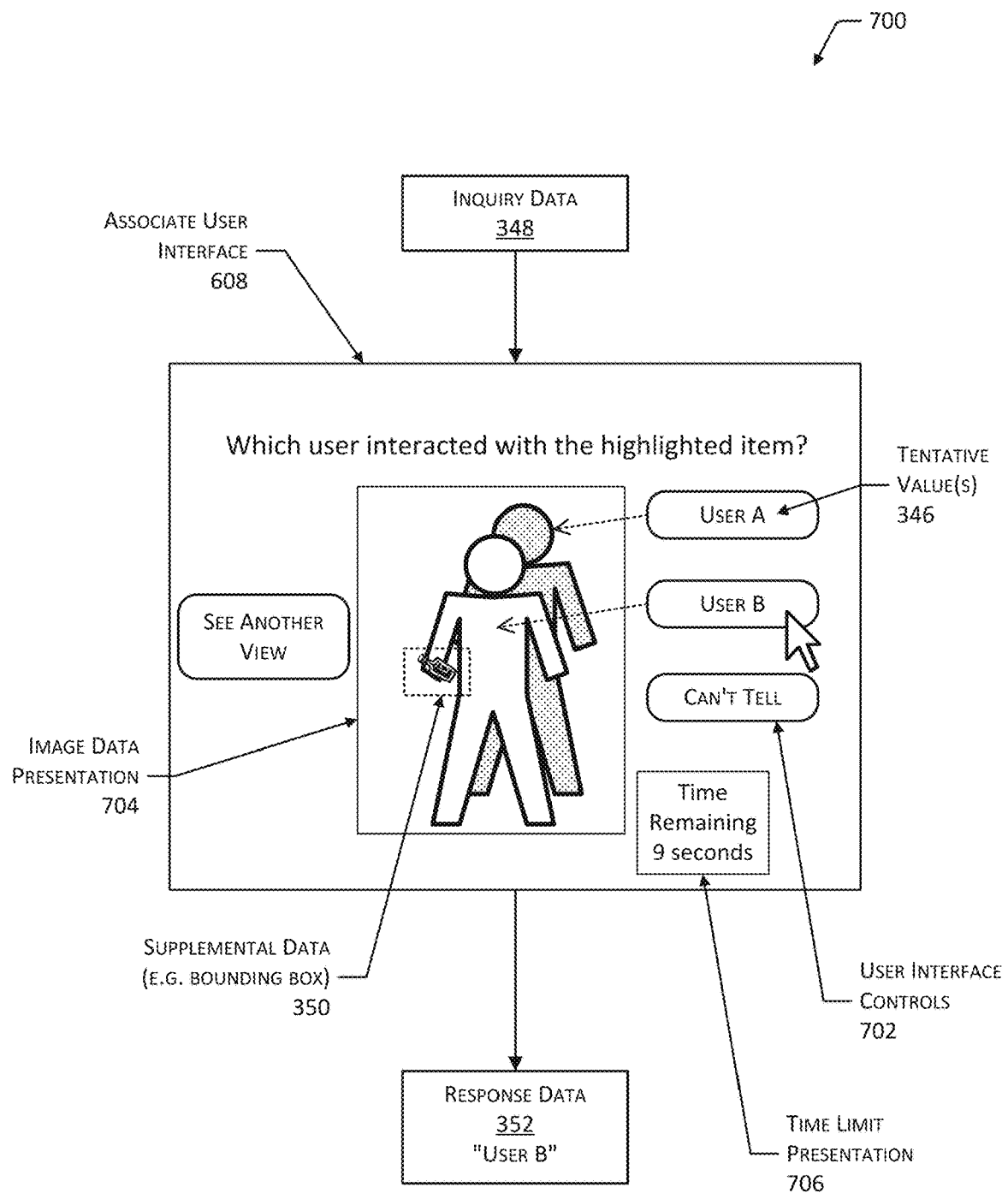
FIG. 7 illustrates an associate user interface configured to present image data to an associate to generate response data associating an item interaction with a particular user of the facility, according to some implementations.

FIG. 7 illustrates an example 700 of an associate user interface 608 configured to present image data 326 to an associate 602 to generate response data 352 associating an item interaction with a particular user 116 of the facility 102, according to some implementations.

In some implementations, the inventory management module 316 may be unable to automatically determine which of a plurality of users 116 interacted with an item 104. In such a situation, the inventory management module 316 may be configured to generate inquiry data 348. The inquiry data 348 may be provided to one or more devices 606 for processing by one or more associates 602. The processing may utilize an associate user interface 608 such as that depicted in FIG. 7.

The associate user interface 608 may include one or more user interface controls 702 and image data presentation 704 elements. The user interface control 702 may be associated with the tentative values 346. In this example, the user interface controls 702 comprise buttons that may be selected by the associate 602. The user interface control 702 may include additional controls such as a "can't tell" indicating that the associate 602 is unable to provide input, or a "see another view" configured to provide image data 326 from a different imaging sensor 120(1). In some implementations, other controls may be available to the associate 602 in the associate user interface 608. For example, image manipulation controls may allow the associate 602 to zoom, minimize, change contrast, sharpen, fast forward or rewind, and so forth.

In some implementations, the image data presentation 704 may have initial settings configured to assist the associate 602 in quickly completing the inquiry. For example, the image data presentation 704 may default to playing back a video clip at one half speed or stepping through a series of still images at one frame per second. As described above, image manipulation controls may allow the associate 602 to change this presentation.

The image data presentation 704 allows the image data 326 associated with the event 124 to be presented to the associate 602. For example, the image data presentation 704 may comprise presentation of one or more still images, video, or a combination thereof.

As described above, the supplemental data 350 may comprise one or more graphical elements. For example, the supplemental data 350 may comprise a bounding box or highlight configured to draw the attention of the associate 602 to a particular portion of the image. The supplemental data 350 may be incorporated into the image data 326 at the server 204. The supplemental data 350 may also be overlaid or presented by the device 606 during presentation of the associate user interface 608. For example, the inquiry data 348 may include data indicative of the placement of the bounding box with respect to the image data 326 being presented in the associate user interface 608.

Once the associate 602 selects a particular user interface control 702 designating one or more of the tentative values 346, the associate user interface 608 may generate data that is used by the device 606 to generate the response data 352. In this example, the associate 602 has selected that the user "B" was the one who interacted with the item 104.

In some implementations instead of the tentative values 346, labels associated with the tentative values 346 may be presented to the associate 602. The labels may be used to anonymize or protect information, such as the users 116 depicted in the image data 326 such that the associate 602 is unaware of the underlying information. For example, the associate user interface 608 as depicted in FIG. 7 provides a user interface control 702 using labels designating "User A" and "User B" rather than identifying information such as the names or unique identifiers of the users 116, such as "User 116(1)" and "User 116(2)".

In some implementations, the sensor data 324 may be modified as well to protect privacy of the users 116. For example, faces or a portion thereof of the users 116 as depicted in the image data 326 may be obscured during presentation in the associate user interface 608.

The associate user interface 608 may be configured to maximize the throughput of the associate 602 with regard to responding to inquiry data 348. For example, the image data presentation 704 may begin playback immediately and may loop playback of video image data 326 continuously until the associate 602 selects one of the user interface controls 702.

In one implementation, the inquiry module 338 may prioritize the image data 326 presented by the associate user interface 608 based on one or more criteria. For example, the criteria may include, but is not limited to, distance between the location of the event 124 and the imaging sensor 120(1), presence of an obscuring object such as another user 116 within the image data 326, image blur present in the image data 326, and so forth. Continuing the example, the inquiry module 338 may be configured to generate inquiry data 348 that first presents image data 326 that is provided by the closest imaging sensor 120(1) with respect to the location. Should the associate 602 activate the user interface control 702 to "see another view", the image data presentation 704 may present the video acquired by the next closest imaging sensor 120(1).

A time limit presentation 706 may also be presented in the associate user interface 608. The time limit presentation 706 may provide an indicator to the associate 602 as to the time remaining to respond to the inquiry. In some implementations, time limit data may be included in the inquiry data 348. In other implementations, responses exceeding the time limit may be disregarded or given reduced importance in determining the output data 126. For example, responses that take too long to be provided may be deemed unreliable due to indecision on the part of the associate 602.

Figure 8:
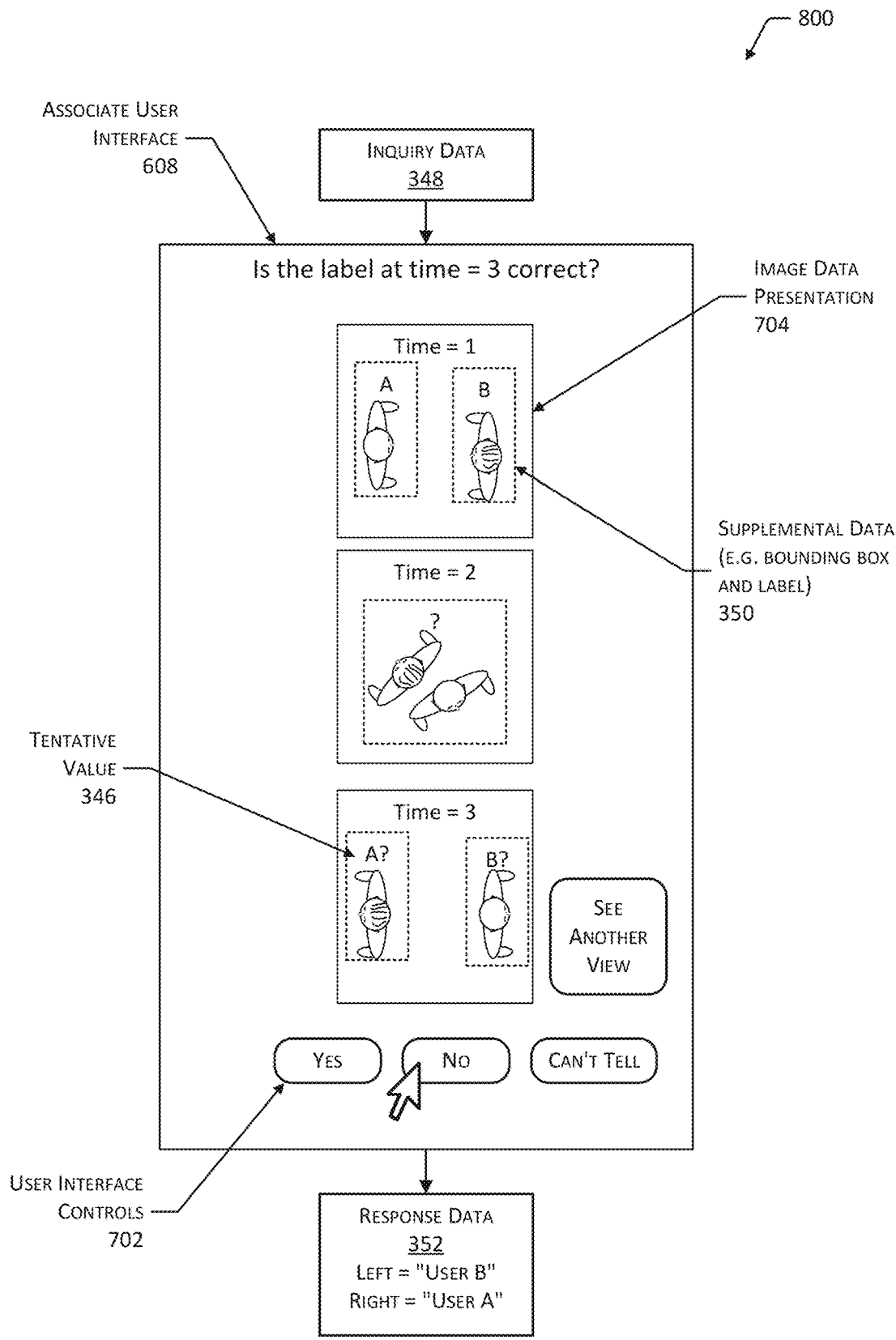
FIG. 8 illustrates an associate user interface configured to present image data to an associate to generate response data disambiguating two users of the facility, according to some implementations.

FIG. 8 illustrates an example 800 of an associate user interface 608 configured to present image data 326 to an associate 602 to generate response data 352 disambiguating two users 116 of the facility 102, according to some implementations.

In some implementations, the inventory management module 316 may be unable to automatically determine the identity of one user 116(1) after being in close proximity to another user 116(2). For example, as users 116(1) and 116(2) move together to a common location in the facility 102, the tracking module 332 may be unable to determine which user 116 exited to the left and which user 116 exited to the right of that common location after moving apart.

As above, the associate user interface 608 may comprise user interface controls 702 and image data presentation 704. In this illustration, a series of still images are presented as acquired at successive times 1, 2, and 3 depicting two users 116(1) and 116(2) passing one another in the aisle 112. In another implementation, the image data 326 comprising video of the event 124 may be presented.

The image data presentation 704 includes the image data 326 acquired from an overhead imaging sensor 120(1) as well as supplemental data 350, such as a bounding box around each of the users 116 and a label for each of the users 116, as depicted in FIG. 8.

In this figure, the associate 602 is presented with user interface controls 702 to indicate "Yes" or "No" as to whether the automatically generated tentative values 346 at time=3 are correct. To protect the identity of the users 116, the tentative values 346 have been replaced with anonymous labels.

In this illustration, the associate 602 responds with a "No" selection, indicating that at time=3 the label incorrectly attributes the user 116 on the left as "A" and the user 116 on the right as "B". The response data 352 thus indicates that the user 116 on the left of the image is "B" and the user 116 on the right of the image is "A".

In another implementation, the associate user interface 608 may omit the presentation of tentative values 346. For example, the associate 602 may be instructed to drag or click the initial bounding box around one of the users 116 and click on the corresponding image of the user 116 at the subsequent time.

Figure 9:
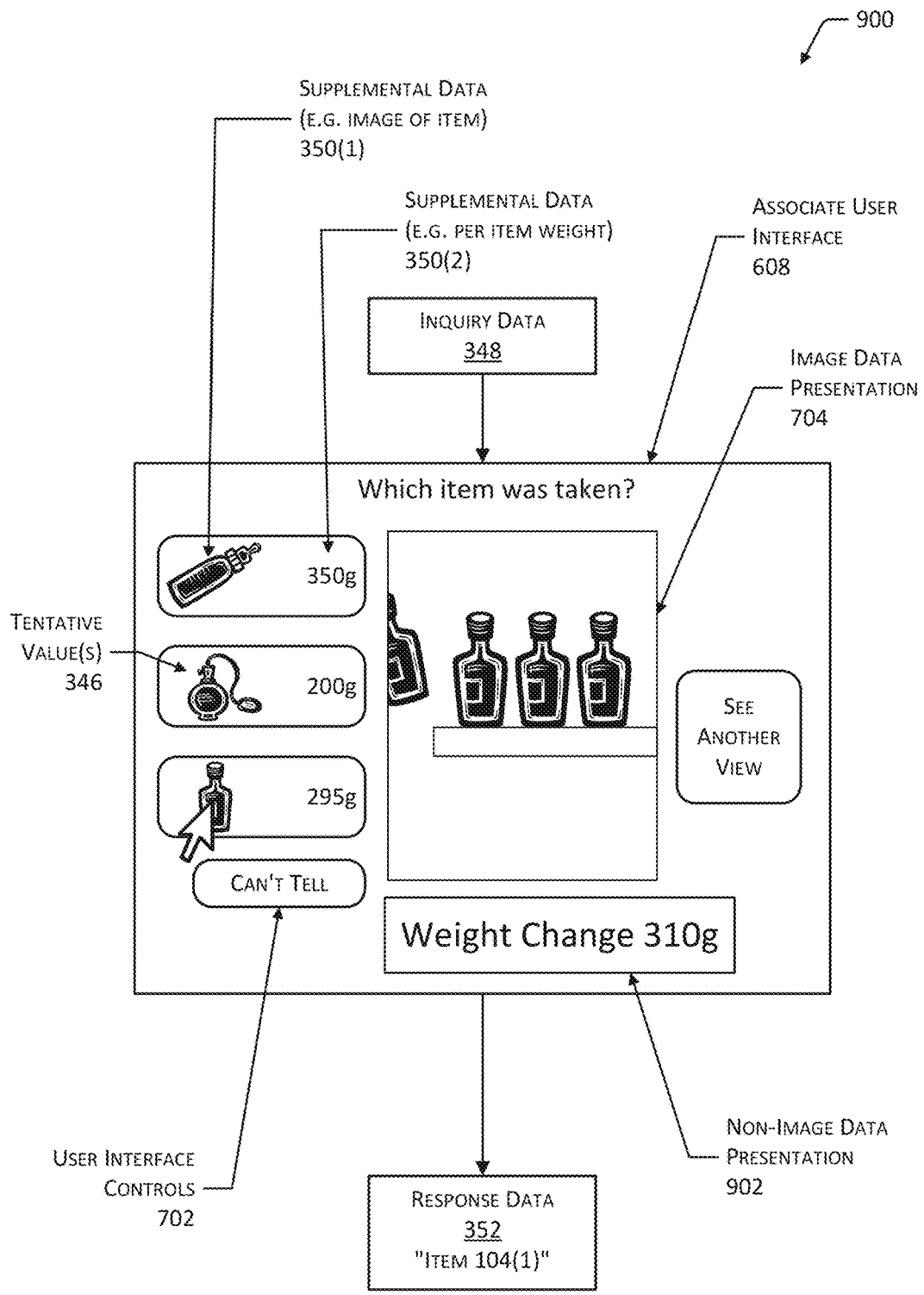
FIG. 9 illustrates an associate user interface configured to present image data and non-image data to generate response data identifying an item removed from an inventory location, according to some implementations.

FIG. 9 illustrates an example 900 of an associate user interface 608 configured to present image data 326 and non-image data 328 to generate response data 352 identifying an item 104 removed from an inventory location 114, according to some implementations.

As described above, the associate user interface 608 may comprise user interface controls 702 and image data presentation 704. For example, the image data presentation 704 may comprise a still image acquired during the event 124. The user interface controls 702 are configured to present the tentative values 346 using supplemental data 350(1) and supplemental data 350(2). The supplemental data 350(1) comprises images of the item 104, such as obtained from the item data 322 stored in the data store 318. The supplemental data 350(2) may comprise the per item weight, such as also obtained from the item data 322.

Non-image data presentation 902 presents at least a portion of the non-image data 328 associated with the event 124. The non-image data presentations 902 may comprise text, numbers, or graphical elements. As depicted here, the non-image data presentation 902 depicts the non-image data 328 indicative of a weight change as measured by the weight sensor 120(6) of the inventory location 114 associated with the event 124.

The inquiry module 338 may be configured to include additional information such as the non-image data 328 in the inquiry data 348. For example, in the situation where the items 104 involved have the same or similar packaging but are provided in different weights, weight data associated with the event 124 may be used.

As described above, the associate 602 may select one or more of the user interface controls 702. Responsive to the selection, the device 606 may generate response data 352. For example, the response data 352 associated with the event 124 depicted in this figure indicates that the item 104 that was taken is item 104(1).

Figure 10:
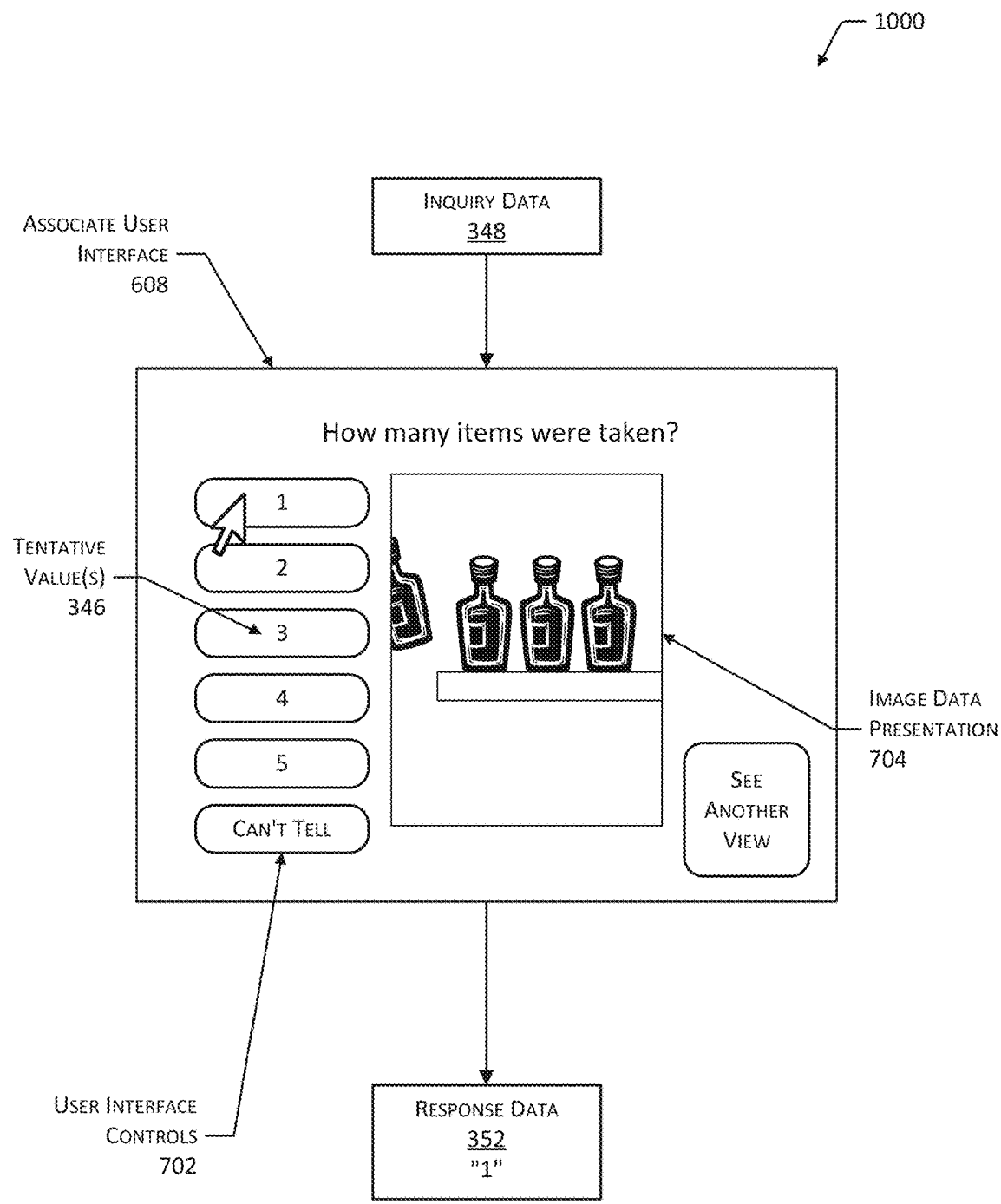
FIG. 10 illustrates an associate user interface configured to present image data and non-image data to generate response data identifying a quantity of items removed from an inventory location, according to some implementations.

FIG. 10 illustrates an example 1000 of an associate user interface 608 configured to present image data 326 and non-image data 328 to generate response data 352 identifying a quantity of items 104 removed from an inventory location 114, according to some implementations.

As described above, the associate user interface 608 may comprise user interface controls 702 and image data presentation 704. For example, the image data presentation 704 may comprise a video acquired during the event 124, such as the user 116 removing an item 104 from the inventory location 114.

The tentative values 346 depicted here comprise numerical quantities that may have been picked from the inventory location 114. The associate 602 may view the image data presentation 704 and make a selection from the user interface controls 702. The resulting response data 352 may then be provided to the inventory management module 316. As a result of the response data 352, the inventory management module 316 may generate output data 126 correctly indicating that the user 116 picked one item 104 from the inventory location 114, as depicted in this figure.

In other implementations, the associate user interface 608 may be used to provide response data 352 for other events 124. For example, the event 124 may comprise an apparent movement of an inventory location 114 within the field of view 128 of an imaging sensor 120(1). The associate user interface 608 may be configured to acquire from the associate 602 information indicative of where the corners or other features on the inventory location 114 are within image data 326. Using this information, the inventory management module 316 may recalibrate the imaging sensor 120(1).

In another implementation, the associates 602 may be used to compensate for failure of one or more other sensors 120. For example, the weight sensor 120(6) at an inventory location 114 may fail. Responsive to this failure, events 124 involving the inventory location 114 having the failed or suspect weight sensor 120(6) may be processed by the inquiry module 338 to receive input from the associates 602.

In still another implementation, the event 124 may be processed to determine marketing data. For example, the event 124 of the user 116 interacting with an item 104 may be processed using the inquiry module 338 to categorize the event 124, such as whether the user 116 exhibited a favorable, neutral, or unfavorable facial expression while interacting with the item 104.

Illustrative Processes

Figure 11:
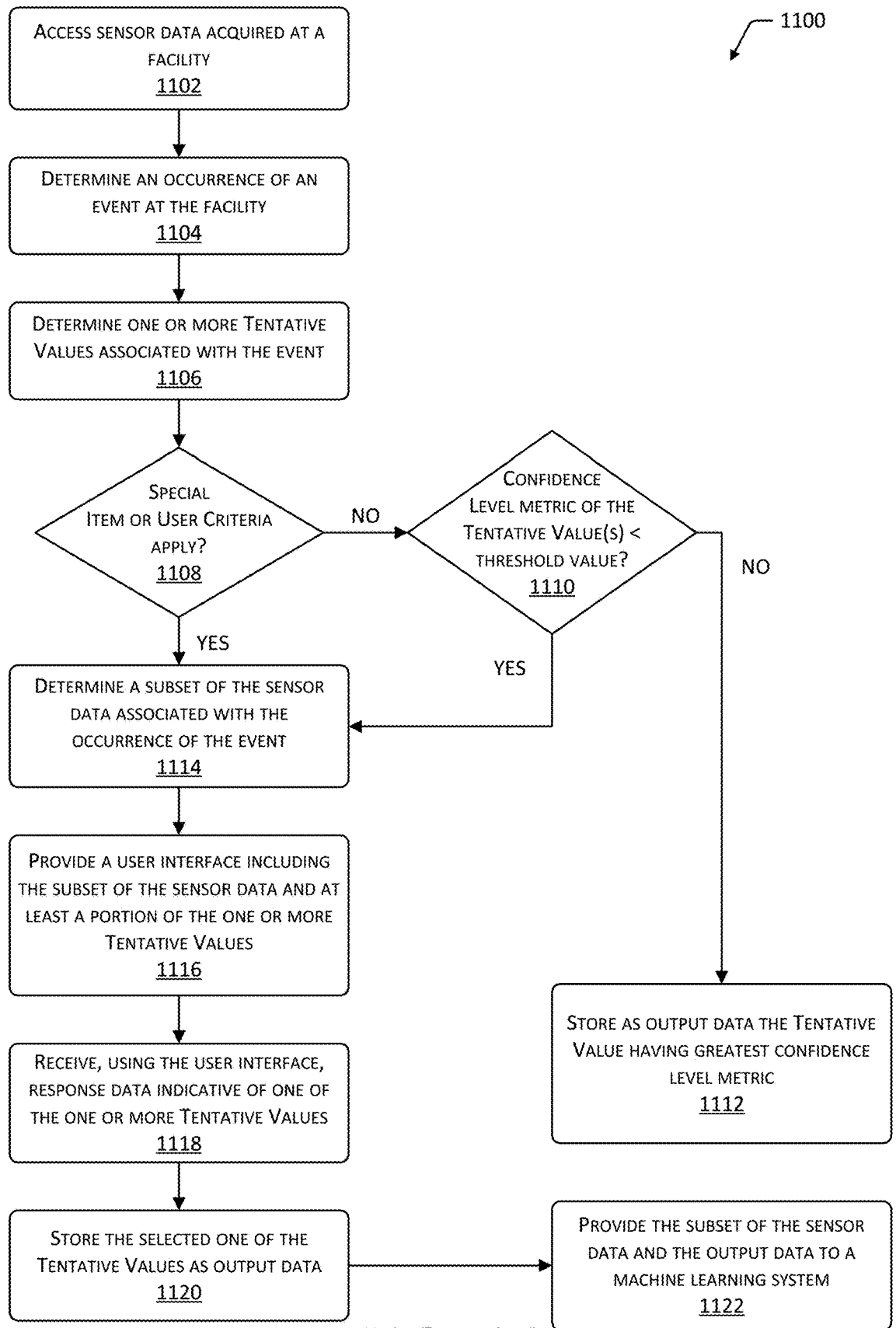
FIG. 11 depicts a flow diagram of a process for generating output data from response data, according to some implementations.

FIG. 11 depicts a flow diagram 1100 of a process for generating output data 126 from response data 352, according to some implementations.

Block 1102 accesses sensor data 324 acquired at the facility 102. For example, sensor data 324 may comprise image data 326 acquired from one or more imaging sensors 120(1).

Block 1104 determines an occurrence of an event 124 at the facility 102. For example, the event determination module 336 may identify an item 104 picked from an inventory location 114, that two users 116 have passed within a threshold distance of one another, and so forth. In another example, the event determination module 336 may determine that an imaging sensor 120(1) has been displaced or an inventory location 114 has been moved.

Block 1106 determines one or more tentative values 346 associated with the event 124. For example, when the event 124 comprises a user 116 interacting with an item 104, the event determination module 336 may generate, using the sensor data 324, tentative values 346 comprising a list of the item 104 identifiers that may be depicted in the image data 326.

In another example, where the event 124 comprises a plurality of users 116 moving towards one another, the plurality of tentative values 346 may comprise user identifiers indicative of identities of the plurality of users 116.

Block 1108 determines if one or more of special item 104 or user 116 criteria apply. In some implementations, particular items 104, or categories or classes of items 104, may be designated for special handling. For example, particular items 104 may be restricted to picking by users 116 who are over a threshold age. In other implementations, particular users 116 or categories of users 116 may be designated for special handling. For example, a user 116 who is on a performance improvement plan for an unusually high number of picking errors may be designated for special handling. When special criteria does not apply, the process may proceed to block 1110. When special criteria does apply, the process may proceed to block 1114.

Block 1110 determines if a confidence level metric 342 of the one or more tentative values 346 is below a threshold value 344. For example, the confidence level metric 342 for each of the tentative values 346 may be determined. Of all the tentative values 346, the tentative value 346 having the greatest confidence level may be determined. When the confidence level metric 342 of the one or more tentative values 346 (or a particular one, such as a particular tentative value 346 having a greatest confidence level metric 342) is greater than or equal to the threshold value 344, the process may proceed to block 1112. When the confidence level metric 342 is less than the threshold value 344, the process may proceed to block 1114. Continuing the example, the tentative value 346 having the greatest confidence level metric 342 may be less than the threshold value.

In other implementations, other techniques such as a set of one or more heuristics may be used to determine when to process the sensor data 324 using the associates 602. For example, rules or heuristics may designate particular events, such as two users 116 moving proximate to one another, as events 124, requiring resolution using the associates 602.

Block 1112 stores as output data 126 the tentative value 346 having the greatest confidence level metric 342. For example, the automated system may be able to identify the item 104 that was picked from the inventory location 114 with a confidence level metric 342 that is high enough to not call for human intervention, and may use that tentative value 346.

Block 1114 determines a subset of the sensor data 324 associated with the occurrence of the event 124. For example, the subset may comprise image data 326 such as video acquired starting at a time before the event 124 and ending at a time after the conclusion of the event 124.

In some implementations, the subset may be determined at least in part by the physical layout data 320. For example, the physical layout data 320 may comprise camera data indicating a location and orientation of one or more of the imaging sensors 120(1). Continuing the example, the subset may comprise image data 326 acquired from the imaging sensors 120(1) that have the location of the event 124 within their respective fields of view 128.

Block 1116 provides an associate user interface 608. As described above, the associate user interface 608 may be generated using inquiry data 348. The associate user interface 608 may present the subset of the image data 326. In some implementations, the associate user interface 608 may present at least a portion of the one or more tentative values 346. As described above, such as with regard to FIG. 7, the associate user interface 608 may include one or more user interface controls 702. The associate 602 may activate one or more of the user interface controls 702 to select one of the tentative values 346 presented.

In some implementations, one or more of the tentative values 346 may be intentionally erroneous. For example, these intentionally erroneous tentative values 346 may be injected into the inquiry process to ascertain whether the associate 602 is adequately performing the selection.

As described above, in some implementations, the associate user interface 608 may present supplemental data 350. For example, where the event 124 comprises the user 116 interacting with an item 104, the supplemental data 350 may comprise previously stored images of the items 104 indicated by the item identifiers in the tentative values 346. In another example, where the event 124 comprises several users 116 moving towards one another, the supplemental data 350 may comprise previously stored images of the users 116 as indicated by the user identifiers in the tentative values 346.

In some implementations, instead of, or in addition to providing the user interface, other actions may be taken. For example, the inventory management module 316 may dispatch an associate 602 who is at the facility 102 to the location in the facility 102 at which the event 124 occurred. The associate 602 may be equipped with one or more sensors 120, such as a wearable imaging sensor 120(1). Based at least in part on the image data 326 acquired from the imaging sensor 120(1) carried by the associate 602, the inventory management module 316 may be able to automatically determine the output data 126. In another implementation, the associate 602 carrying the imaging sensor 120(1) may be presented with the associate user interface 608 and may provide response data 352.

Block 1118 receives, from the associate user interface 608, response data 352 indicative of a selection of one or more tentative values 346. In some implementations, the response data 352 may indicate no match, that the information provided is insufficient to answer the inquiry, and so forth.

Block 1120 stores the selected one of the tentative values 346 as the output data 126. For example, the inquiry module 338 may determine the tentative value 346 that was selected by a majority of the associates 602 and designate the majority selected tentative value 346 as the output data 126.

The output data 126 may be used for a variety of purposes. For example, the output data 126 may be used to bill a particular account. In another example, the output data 126 may be used to calibrate the image sensor 120(1). For example, the output data 126 may comprise an indication by the associate 602 of particular points (such as the corners) of an inventory location 114. This output data 126 may then be used to recalibrate the image data 326 from the imaging sensor 120(1).

Block 1122 may provide the subset of the sensor data 324 and the output data 126 to the machine learning system that generated the tentative values 346 or to another machine learning system. The machine learning system may then be trained or otherwise updated using the sensor data 324 and the corresponding output data 126 produced from the response data 352, potentially improving accuracy over time. For example, the sensor data 324 and the output data 126 may be designated as training data. Continuing the example, where the machine learning system uses OpenCV, the training data may be used to modify or create new Bayesian classifiers using the function "CvNormalBayesClassifier::train". Different machine learning systems may use different processes for training.

Figure 12:
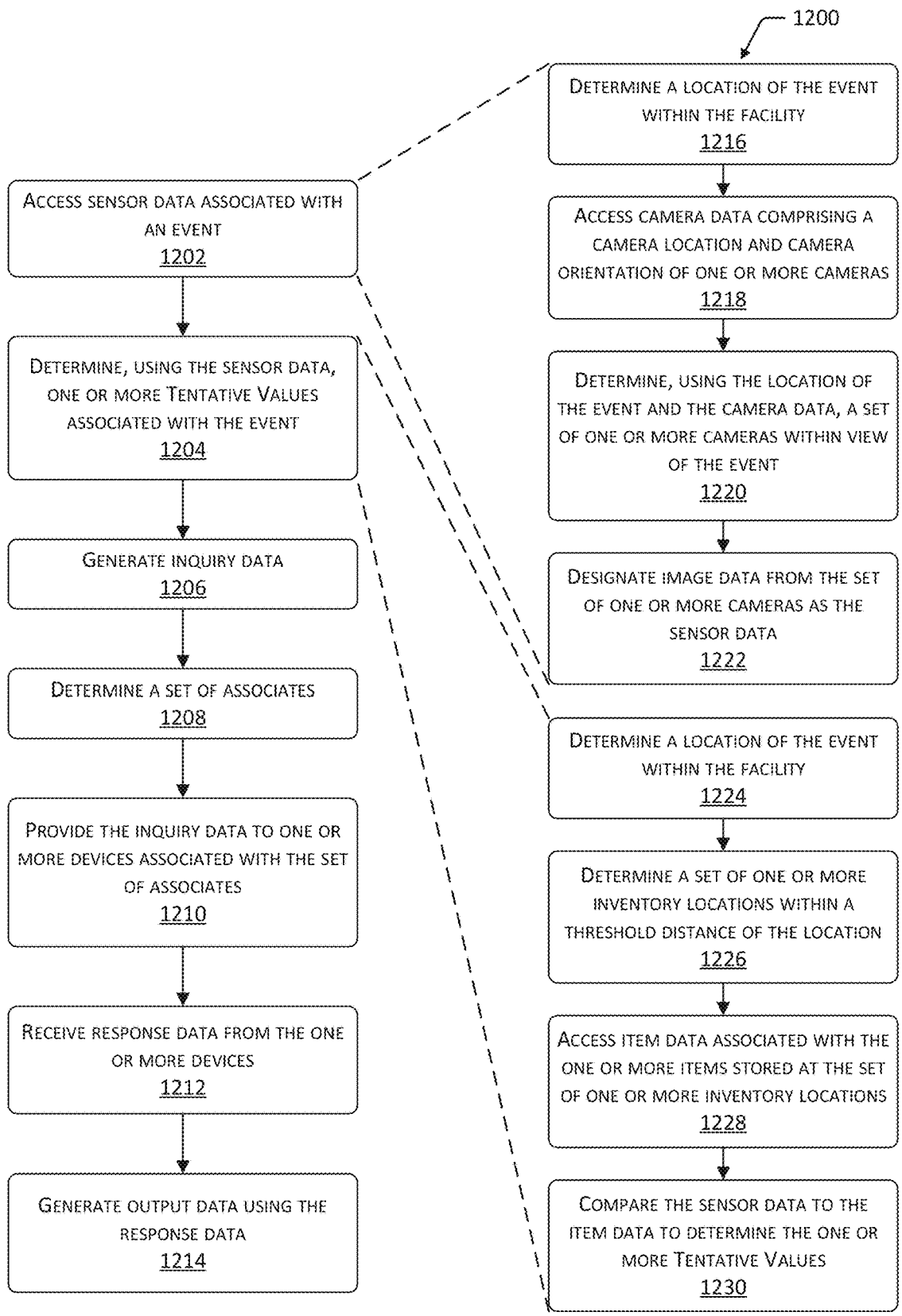
FIG. 12 depicts a flow diagram of another process for generating output data from response data, according to some implementations.

FIG. 12 depicts a flow diagram 1200 of another process for generating output data 126 from response data 352, according to some implementations.

Block 1202 accesses sensor data 324 associated with an event 124. For example, the image data 326 acquired by imaging sensors 120(1) to have a field of view 128 directed towards the location of the event 124 may be accessed.

Block 1204 determines, using the sensor data 324, one or more tentative values 346 associated with the event 124. For example, the event determination module 336 may generate a list of possible item identifiers, user identifiers, actions taken by the user 116, and so forth. For example, the tentative values 346 may comprise the actions of "picking an item", "placing and item", or "damaging an item".

In some implementations, the determination of the tentative values 346 may use one or more machine learning systems. For example, the tentative values 346 may be generated by processing sensor data 324 with one or more of artificial neural networks, classifiers, decision trees, support vector machines, Bayesian networks, and so forth.

Block 1206 generates inquiry data 348. For example, the inquiry module 338 may access the subset of the sensor data 324 that is associated with the event 124. In some implementations, the inquiry data 348 may include one or more of the tentative values 346 or data associated with the tentative values 346, such as anonymized labels.

In some implementations, generation of the inquiry data 348 may be responsive to the determination that the confidence level metrics 342 of the tentative value(s) 346 are below a threshold value 344. For example, determination that the confidence level metrics 342 are below a threshold value 344 such as 97% may result in the generation of the inquiry data 348 and subsequent process described below.

Block 1208 determines a set of associates 602. For example, given a type of the event 124, the list of associates 602 that are available to process inquiries may be filtered to those associates 602 having a requisite level of experience in resolving inquiries of the given type.

Block 1210 provides the inquiry data 348 to one or more devices 606 associated with the set of associates 602. For example, the inquiry data 348 may be placed into a work queue that is pulled by an application executing on the devices 606, or the inquiry data 348 or an indicator thereof may be pushed to the one or more devices 606 using one or more networks 202.

As described above, in some implementations, the set of associates 602 may be determined using information such as the location of the associate 602. In one implementation, the devices 606 associated with the associates 602 may be determined to be located at the facility 102. For example, the devices 606 may be detected on the local area network of the facility 102. The inquiry data 348 may be provided to those devices 606 that are present at the facility 102. Continuing the example, inquiries having a SLA of less than 20 seconds to generate output data 126 may use associates 602 present at the facility 102 given the higher bandwidth access to the sensor data 324.

In another implementation, one or more devices 606 that are located external to the facility 102 may be determined. For example, the associates 602 using those devices 606 may be at the associate office 604. The inquiry data 348 may be sent to at least one of the one or more associates 602 external to the facility 102. For example, some inquiries may have a SLA of less than 30 minutes and thus may be handled by associates 602 having lower bandwidth access to the sensor data 324. These inquiries may be directed to the associates 602 external to the facility 102.

In some implementations, inquiry data 348 may be sent to associates 602 at the facility 102 and at other locations. For example, the output data 126 may be initially determined using the response data 352 from associates 602 on-site at the facility 102, and later responses received from associates 602 at another location may be received at a later time and used to confirm the accuracy of the output data 126.

Block 1212 receives, from the one or more devices 606, response data 352. As described above, response data 352 may be indicative of selection of the one or more tentative values 346 or an indication of other conditions such as inability of the associate 602 to answer the inquiry.

Block 1214 generates output data 126 using the response data 352. For example, the tentative value 346 selected by the majority of the associates 602, as indicated by the response data 352, may be stored as the output data 126.

In some implementations, the output data 126 may be provided to the machine learning system used by block 1204 to determine the tentative values 346. For example, the artificial neural network may be trained using the output data 126 and the associated sensor data 324 of the event 124.

In some implementations, the associates 602 may need additional information to resolve the inquiry. For example, a block (not illustrated) may determine a first subset of the response data 352(1) comprises values different from a second subset of the response data 352(2). A block accesses second sensor data 324(2) acquired at the facility 102. Another block generates second inquiry data 348(2) comprising one or more of the second sensor data 324(2) or retrieval data for the second sensor data 324(2). Yet another block provides the second inquiry data 348(2) to the one or more devices 606 associated with the set of associates 602. The associates 602 may then return second response data 352(2) that may be used instead of, or in conjunction with, the previously acquired first response data 352(1).

Returning to block 1202, the sensor data 324 associated with the event 124 that is accessed may be determined in several ways. One implementation is depicted by blocks 1216-1222.

Block 1216 determines a location of the event 124 within the facility 102. For example, using the image data 326 from a plurality of imaging sensors 120(1) at known locations, the location in space of the event 124 may be determined.

Block 1218 accesses camera data. As described above with regard to the physical layout data 320, the camera data may comprise one or more of a location in the facility 102 of the imaging sensor 120(1) as well as an orientation of the imaging sensor 120(1). In some implementations, additional camera data such as operational status may be accessed.

Block 1220 determines, using the location of the event 124 and the camera data, a set of one or more imaging sensors 120(1) likely within view of the event 124. For example, the imaging sensor 120(1) may be deemed to be within view of the event 124 when it is less than a threshold distance from the location of the event 124, and the field of view 128 of the imaging sensor 120(1) is determined to include the location of the event 124.

Block 1222 designates the image data 326 from the set of the one or more imaging sensors 120(1) as the sensor data 324 as accessed by block 1202. For example, the subset of the image data 326 is acquired from the imaging sensors 120(1) that are deemed to be within view of the event 124 may be used as the sensor data 324.

Returning to block 1204, the sensor data 324 may be used at least in part to generate the tentative values 346 in several ways. One implementation is depicted by blocks 1224-1230.

Block 1224 determines a location of the event 124 within the facility 102. For example, sensor data 324 may indicate that the tag 206 associated with the user 116 involving the event 124 is at a particular location based at least in part on signals 208 received by the RFID reader 120(8).

Block 1226 determines a set of one or more inventory locations 114 within a threshold distance of the location. For example, where the event 124 comprises a "pick" event, the threshold distance may be 1 (m). By using the location of the event 124, the inventory management module 316 may access the physical layout data 320 to determine the inventory locations 114 within 1 m of the user's 116 location.

Block 1228 accesses item data 322 associated with one or more items 104 stored at the set of one or more inventory locations 114. For example, given the inventory location 114(1) and the item data 322 indicating where items 104 are stored, a list of item identifiers indicating items 104(7), 104(21), and 104(25) as being possibly at the inventory location 114(1) may be accessed.

Block 1230 compares the sensor data 324 to the item data 322 to determine the one or more tentative values 346. For example, the item 104(25) may be removed from the list due to an excessive weight difference. As a result, the tentative value 346 may comprise item identifiers for the items 104(7) and 104(21). In other implementations, other analyses may be performed between the sensor data 324 and the item data 322. For example, one or more image processing techniques may be used to compare the image of the item 104 depicted in the image data 326 with previously stored images maintained in the item data 322.

Figure 13:
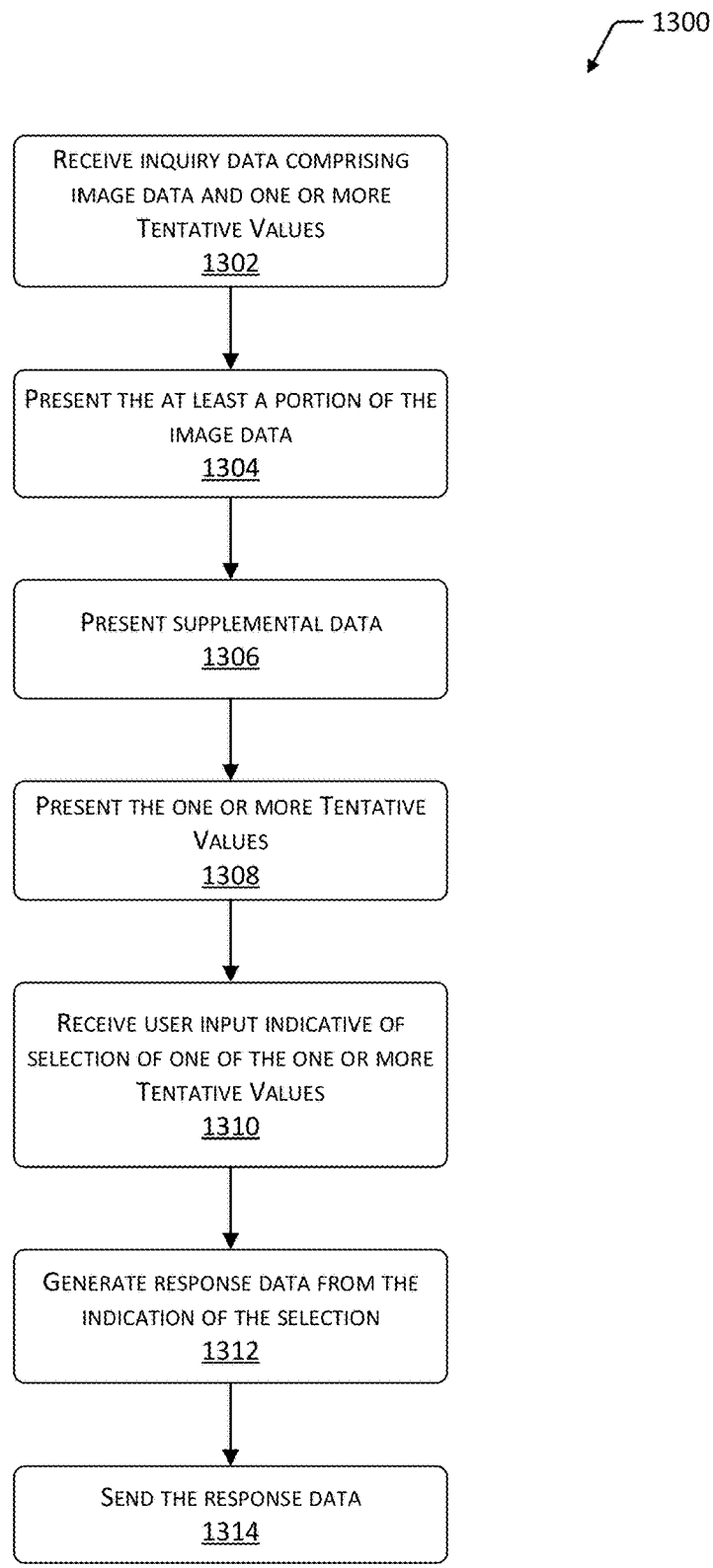
FIG. 13 depicts a flow diagram of a process for presenting an associate user interface, according to some implementations.

FIG. 13 depicts a flow diagram 1300 of presenting an associate user interface 608, according to some implementations.

Block 1302 receives inquiry data 348. As described above, the inquiry data 348 may comprise information indicative of at least a portion of image data 326 acquired from the sensors 120 in the facility 102. In some implementations, the inquiry data 348 may include one or more of one or more tentative values 346, non-image data 328, and so forth. For example, the inquiry data 348 may include weights acquired from the weight sensors 120(6).

Block 1304 presents the at least a portion of the image data 326. For example, the associate user interface 608 may present the image data presentation 704. In some implementations, the non-image data 328 may be presented instead of, or in addition to, the image data presentation 704.

Block 1306 presents supplemental data 350. For example, the supplemental data 350 may comprise one or more graphical overlays that appear with the image data presentation 704. The graphical overlays may depict indicia of an object of interest as depicted by the image data 326. For example, a bounding box or highlight may be placed around an item 104 depicted in the image that needs to be identified by the associate 602.

When the one or more tentative values 346 are available, the block 1308 may present the one or more tentative values 346. For example, the user interface controls 702 may allow the associate 602 to select the tentative value 346 that is correct.

In some implementations, presenting the supplemental data 350 may include one or more images associated with the one or more tentative values 346. For example, the supplemental data 350 may present images of items stored at the facility 102, the users 116, and so forth.

Block 1310 receives user input associated with the inquiry. For example, the user input may comprise data indicative of selection of at least one of the one or more tentative values 346.

Block 1312 generates response data 352 from the indication of the selection. Block 1314 send the response data 352. For example, the response data 352 may be sent from the device 606 of the associate 602 to the inventory management module 316.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions Include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a plurality of cameras configured to acquire image data;
a memory, storing computer-executable instructions; and
a hardware processor in communication with the plurality of cameras and the memory, wherein the hardware processor is configured to execute the computer-executable instructions to:
    analyze the image data;
    determine an occurrence of a first user handling an item at a facility;
    determine, using the image data, a plurality of possible item identifiers of the item handled by the first user;
    determine a confidence level metric indicative of accuracy of each of the plurality of possible item identifiers;
    determine a possible item identifier, of the plurality of possible item identifiers, having a greatest confidence level metric;
    determine the possible item identifier with the greatest confidence level metric has a confidence level metric less than a threshold value for identifying the item handled by the first user;
    based on the possible item identifier with the greatest confidence level metric having a confidence level metric less than the threshold value for identifying the item handled by the first user, determine confirmation of an identity of the item handled by the first user is required by a second user;
    determine a portion of the image data comprising images of the occurrence of the first user handling the item;
    determine supplemental data for the occurrence, the supplemental data comprising one or more of:
        weight data associated with at least a portion of the plurality of possible item identifiers, and
        velocity data associated with the at least a portion of the plurality of possible item identifiers;
    provide a user interface to the second user, the user interface comprising:
        the portion of the image data,
        the at least a portion of the plurality of possible item identifiers,
        the supplemental data, at least a portion of the supplemental data presented as an overlay on the portion of the image data, and
        one or more user interface elements to facilitate selection of one of the plurality of possible item identifiers by the second user;
    receive, from the second user, response data indicative of the confirmation of the identity of the item handled by the first user via a selection of the one of the plurality of possible item identifiers; and
    store the selected one of the plurality of possible item identifiers as output data.

2. The system of claim 1, wherein:
the first user handling the item at the facility comprises the first user interacting with the item at an inventory location, wherein the interacting comprises one or more of adding or removing the item from the inventory location; and
the hardware processor is further configured to execute the computer-executable instructions to:
    access second supplemental data comprising previously stored images of items indicated by the plurality of possible item identifiers; and
    present the second supplemental data with the user interface.

3. The system of claim 1, wherein the hardware processor is further configured to execute the computer-executable instructions that determine the confidence level metric to:
    compare item images with a set of previously stored item images associated with the plurality of possible item identifiers;
    determine a difference between the item images and the set previously stored item images; and
    generate the confidence level metric based at least in part on the difference.

4. A method comprising:
accessing image data acquired by one or more camera at a materials handling facility;
analyzing the image data to determine occurrence of an event, the event comprising a first user handling an item at the materials handling facility;
determining, using the image data, one or more possible item identifiers of the item handled by the first user;
determining each of the one or more possible item identifiers has a confidence level metric less than a threshold value for identifying the item handled by the first user;
determining confirmation of an identity of the item handled by the first user is required by at least a second user based on the each of the one or more possible item identifiers having a confidence level metric less than the threshold value for identifying the item handled by the first user;
generating inquiry data for the at least a second user, the inquiry data comprising:
    at least a portion of the image data, or retrieval data for the image data used to generate the one or more possible item identifiers,
    the one or more possible item identifiers, and
    supplemental data, the supplemental data comprising one or more of:
        item weight data for one or more possible items handled by the first user, and
        item velocity data for the one or more possible items handled by the first user;
determining a set of one or more second users to whom the inquiry data is to be sent;
sending the inquiry data to one or more devices associated with the set of one or more second users;
causing a user interface to be presented to the one or more second users in the set, the user interface including the inquiry data; and
receiving, from the one or more devices, response data, from at least some of the one or more second users in the set, indicative of the confirmation of the identity of the item handled by the first user via a selection of one of the one or more possible item identifiers.

5. The method of claim 4, further comprising:
accessing event description data indicative of one or more predefined triggers; and
detecting presence of one of the one or more predefined triggers in the image data.

6. The method of claim 4, wherein the inquiry data further comprises one or more of:
a user identifier for the first user, or
an action taken by the first user of the materials handling facility.

7. The method of claim 4, further comprising:
determining, based on the image data from the one or more cameras, a location of the event comprising the first user handling the item within the materials handling facility;
determining, using the location of the event comprising the first user handling the item within the materials handling facility, the one or more cameras within view of the first user handling the item; and
wherein the determining the one or more possible item identifiers further uses the image data from the one or more cameras within view of the event comprising the first user handling the item.

8. The method of claim 4, further comprising:
determining a location of the event comprising the first user handling the item within the materials handling facility;
determining one or more inventory locations within a threshold distance of the location;
accessing item data associated with one or more items stored at the one or more inventory locations; and
the determining the one or more possible item identifiers further using the one or more items stored at the one or more inventory locations.

9. The method of claim 4, further comprising:
determining a service level associated with the inquiry data, wherein the service level is indicative of a response time within which the response data is to be received;
when the response time is below a response time threshold level:
  determining the one or more devices are located at the materials handling facility; and
  wherein the sending the inquiry data to the one or more devices comprises sending the inquiry data to at least one of the one or more devices at the materials handling facility; and
when the response time is greater than or equal to the response time threshold level:
  determining the one or more devices are located external to the materials handling facility; and
  wherein the sending the inquiry data to the one or more devices comprises sending the inquiry data to at least one of the one or more devices external to the materials handling facility.

10. The method of claim 4, further comprising:
determining edges of an object in the image data;
generating data specifying coordinates of a bounding box configured to encompass the edges of the object; and
the inquiry data further comprising the coordinates of the bounding box with respect to the image data.

11. The method of claim 4, further comprising:
generating the confidence level metric indicative of accuracy of the each of the one or more possible item identifiers.

12. The method of claim 4, further comprising:
determining a time limit for response to the inquiry data;
wherein the inquiry data further comprises information indicative of the time limit; and
further wherein the response data is received within the time limit.

13. The method of claim 4, further comprising:
generating performance data using the response data of individual second users in the set of one or more second users; and
wherein the determining the set of one or more second users is based at least in part on the performance data.

14. The method of claim 4, further comprising:
determining a majority of the response data received from at least a portion of the set of one or more second users indicates a particular item identifier; and
storing the particular item identifier as output data.

15. The method of claim 4, further comprising:
determining the one or more possible item identifiers using one or more machine learning systems;
accessing the image data and corresponding response data with the one or more machine learning systems;
designating the image data and the corresponding response data as training data; and
processing the training data using the one or more machine learning systems.

16. The method of claim 4, further comprising:
determining a first subset of the response data comprises values different from a second subset of the response data;
accessing second image data acquired at the materials handling facility;
generating second inquiry data comprising one or more of the second image data, or retrieval data for the second image data; and
providing the second inquiry data to the one or more devices associated with the set of one or more second users.

17. The method of claim 4, further comprising accessing additional sensor data, wherein the additional sensor data comprises one or more of:
second image data,
three-dimensional sensor data,
button data,
touch sensor data,
audio data,
weight data,
light sensor data,
radio-frequency identification tag data,
radio-frequency data,
accelerometer data,
gyroscope data, or
magnetometer data.

18. A method comprising:
receiving inquiry data regarding an event involving a first user handling an item at a materials handling facility, responsive to determining that each of one or more possible item identifiers of the item handled by the first user has a confidence level metric less than a threshold value for identifying the item and responsive to determining that confirmation of an identity of the item handled by the first user is required by a second user, the inquiry data for the second user comprising:
  information indicative of at least a portion of image data acquired from one or more cameras at the materials handling facility, the at least a portion of the image data comprising images of the event involving the first user handling the item at the materials handling facility,
  the one or more possible item identifiers of the item handled by the first user, and
  supplemental data, the supplemental data comprising one or more of:
    item weight data for one or more possible items handled by the first user, and
    item velocity data for the one or more possible items handled by the first user;
presenting the at least a portion of the image data in a user interface;

presenting the one or more possible item identifiers of the item handled by the first user in the user interface;

presenting the supplemental data in the user interface;

receiving user input from the second user indicative of the identity of the item handled by the first user via a selection of at least one of the one or more possible item identifiers; and sending response data indicative of the selection.

19. The method of claim 18, further comprising:

presenting the supplemental data as one or more graphical overlays, wherein the one or more graphical overlays depict indicia of an object of interest as depicted by the at least a portion of the image data.

20. The method of claim 18, further comprising:

presenting second supplemental data comprising one or more second images associated with the one or more possible item identifiers, the one or more second images depicting one or more of: items stored at the materials handling facility, or users of the materials handling facility.

* * * * *

UNITED STATES PATENT AND TRADEMARK OFFICE
CERTIFICATE OF CORRECTION

PATENT NO. : 10,733,565 B1
APPLICATION NO. : 14/502280
DATED : August 4, 2020
INVENTOR(S) : Stephens et al.

Page 1 of 1

It is certified that error appears in the above-identified patent and that said Letters Patent is hereby corrected as shown below:

In the Claims

Column 36, Claim 3, Line 10:
Currently reads: "set previously stored item images"
Where it should read: --set of previously stored item images--

Column 36, Claim 4, Line 14:
Currently reads: "one or more camera at"
Where it should read: --one or more cameras at--

Signed and Sealed this
Fifteenth Day of September, 2020

Andrei Iancu
*Director of the United States Patent and Trademark Office*